(12) United States Patent  
Murakami et al.

(10) Patent No.: US 9,106,486 B2  
(45) Date of Patent: *Aug. 11, 2015

(54) TRANSMISSION APPARATUS, RECEPTION APPARATUS AND DIGITAL RADIO COMMUNICATION METHOD

(75) Inventors: Yutaka Murakami, Kanagawa (JP); Shinichiro Takabayashi, Kanagawa (JP); Masayuki Orihashi, Chiba (JP); Akihiko Matsuoka, Kanagawa (JP)

(73) Assignee: Wi-Fi One, LLC, Plano, TX (US)

( * ) Notice: Subject to any disclaimer, the term of this patent is extended or adjusted under 35 U.S.C. 154(b) by 507 days.

This patent is subject to a terminal disclaimer.

(21) Appl. No.: 13/613,407

(22) Filed: Sep. 13, 2012

(65) Prior Publication Data

US 2013/0003887 A1 Jan. 3, 2013

Related U.S. Application Data

(60) Continuation of application No. 12/206,427, filed on Sep. 8, 2008, now Pat. No. 8,295,399, which is a continuation of application No. 11/955,443, filed on Dec. 13, 2007, now Pat. No. 7,545,882, which is a (Continued)

(30) Foreign Application Priority Data

Jul. 28, 1999 (JP) .................................... 11-213289

(51) Int. Cl.  
*H04B 15/00* (2006.01)  
*H04L 27/12* (2006.01)  
(Continued)

(52) U.S. Cl.  
CPC .............. *H04L 27/12* (2013.01); *H04L 1/0003* (2013.01); *H04L 1/0006* (2013.01); *H04L 27/206* (2013.01); *H04L 27/34* (2013.01); *H04L 27/3455* (2013.01)

(58) Field of Classification Search  
USPC .......................................................... 375/285  
See application file for complete search history.

(56) References Cited

U.S. PATENT DOCUMENTS 4,843,352 A 6/1989 Kamisaka et al.  
4,899,367 A * 2/1990 Sampei ......................... 375/264

(Continued)

FOREIGN PATENT DOCUMENTS

EP 0734132 9/1996  
JP 63-252050 10/1988

(Continued)

OTHER PUBLICATIONS

Kuo et al., "Design for Pilot-Symbol-Assisted Burst-Mode Communications with Fading and Frequency Uncertainty," International Journal of Wireless Information Networks, Plenum Press, New York, NY, U.S., vol. 1, No. 4, Oct. 1994, pp. 239-252.

(Continued)

*Primary Examiner* — Ankur Jain  
(74) *Attorney, Agent, or Firm* — Nixon & Vanderhye P.C.

(57) ABSTRACT

A transmission method includes generating first symbols for transmitting data, a signal point of each of the first symbols on an in-phase and quadrature-phase plane comprising an in-phase component and a quadrature-phase component and generating a second symbol, the second symbol being a pilot symbol. The method further includes selecting an insertion pattern of the second symbol, from a plurality of predetermined insertion patterns, inserting the second symbol in the first symbols based on the selected insertion pattern to generate a transmission signal, and transmitting the transmission signal. The first symbols are generated using a modulation scheme selected from a plurality of modulation schemes.

12 Claims, 25 Drawing Sheets

Related U.S. Application Data division of application No. 10/827,445, filed on Apr. 20, 2004, now Pat. No. 7,359,457, which is a continuation of application No. 09/627,070, filed on Jul. 27, 2000, now Pat. No. 6,993,092.

(51) Int. Cl.
*H04L 1/00* (2006.01)
*H04L 27/20* (2006.01)
*H04L 27/34* (2006.01)

(56) References Cited

U.S. PATENT DOCUMENTS

| | | | | |
|---|---|---|---|---|
| 5,214,656 | A * | 5/1993 | Chung et al. | 714/758 |
| 5,377,194 | A * | 12/1994 | Calderbank | 370/524 |
| 5,577,087 | A * | 11/1996 | Furuya | 375/377 |
| 5,596,608 | A * | 1/1997 | Sassa et al. | 375/346 |
| 5,692,015 | A | 11/1997 | Higashi et al. | |
| 5,771,224 | A | 6/1998 | Seki et al. | |
| 5,901,185 | A * | 5/1999 | Hassan | 375/346 |
| 6,175,558 | B1 | 1/2001 | Miya | |
| 6,466,563 | B1 | 10/2002 | Yamada | |
| 6,490,270 | B1 * | 12/2002 | Krishnamoorthy et al. | 370/347 |
| 6,993,092 | B1 | 1/2006 | Murakami et al. | |

FOREIGN PATENT DOCUMENTS

| | | |
|---|---|---|
| JP | 1-196924 | 8/1989 |
| JP | 7-250116 | 9/1995 |
| JP | 8-116345 | 5/1996 |
| JP | 8-223239 | 8/1996 |
| JP | 9-83600 | 3/1997 |
| JP | 9-93302 | 4/1997 |
| JP | 9-200282 | 7/1997 |
| JP | 10-065645 | 3/1998 |
| JP | 10-93650 | 4/1998 |
| JP | 10-247955 | 9/1998 |
| JP | 11-191794 | 7/1999 |
| WO | 95/35615 | 12/1995 |
| WO | 99/27508 | 6/1999 |

OTHER PUBLICATIONS

Kuo et al., "User slot design and performance analysis for burst mode communications with fading and frequency uncertainty," Proceedings of the Global Telecommunications Conference (GLOBECOM), San Francisco, Nov. 28-Dec. 2, 1994, New York, IEEE, U.S., vol. 1, Nov. 28, 1994, pp. 24-28.

Gansman et al., "Frame Synchronization for PSAM on Rayleigh Fading Channels," Conference Record of the ASILOMAR Conference on Circuits, Systems and Computers, vol. 1, Oct. 30, 1995, pp. 260-264.

Otsuki et al., "Performance Analysis of Adaptive Modulation Systems Using Square-QAM", Technical Report of IEICE, RCS94-96, Sep. 1994, pp. 43-48, together with an English language Abstract thereof.

Murakami et al., "A Method of Frame Structure in QAM Channels", Matsushita Research Institute Tokyo, Inc., together with an English language Abstract thereof.

Murakami, et al., A Study of Inserting QPSK Symbols into 16 QAM Streams, Lecture Papers of The Institute of Electronics, Information and Communication Engineers (1998), Japan, The Institute of Electronics, Information and Communication Engineers, Mar. 1998, Communication 1, B-5-69, p. 433, together with an English language Abstract thereof.

Japan Office action, dated Nov. 24, 2010 along with an english translation thereof.

* cited by examiner

TRANSMISSION APPARATUS, RECEPTION APPARATUS AND DIGITAL RADIO COMMUNICATION METHOD

CROSS REFERENCE TO RELATED APPLICATIONS

This application is a continuation of U.S. patent application Ser. No. 12/206,427, filed on Sep. 8, 2008, now U.S. Pat. No. 8,295,399, which is a continuation of U.S. patent application Ser. No. 11/955,443, filed Dec. 13, 2007, now U.S. Pat. No. 7,545,882, which is a divisional application of U.S. patent application Ser. No. 10/827,445, filed Apr. 20, 2004, now U.S. Pat. No. 7,359,457, which is a continuation of U.S. patent application Ser. No. 09/627,070, filed Jul. 27, 2000, now U.S. Pat. No. 6,993,092, which claims priority to JP 11-213289 filed Jul. 28, 1999, the disclosures of which are expressly incorporated herein by reference in their entireties.

BACKGROUND OF THE INVENTION

1. Field of the Invention

The present invention relates to a transmission apparatus, reception apparatus and digital radio communication method, which is used for digital radio communications.

2. Description of the Related Art

As a conventional digital modulation system, a technology described in the Unexamined Japanese Patent Publication No. HEI 1-196924 is known. This is the technology which the transmitting side configures a frame by inserting 1 known pilot symbol for every N data symbols and the receiving side estimates a frequency offset and amount of amplitude distortion by using the pilot symbol, and removes these frequency offset and amplitude distortion and demodulates.

Here, in the case of a radio communication, fluctuations in the transmission path occur due to fading and in terrestrial mobile communication in particular, fluctuations in the transmission path are not uniform. When fluctuations in the transmission path are intense, the interval of inserting a pilot symbol must be shorter to prevent deterioration of the data demodulation error rate. On the contrary, when fluctuations in the transmission path are gentle, extending the interval of inserting a pilot symbol does not deteriorate the data demodulation error rate so much.

On the other hand, when the level of a reception signal on the receiving side is small, a modulation system used must be highly resistant to errors for information symbols. On the contrary, when the level of a reception signal on the receiving side is large, higher priority can be given to a modulation system of high transmission efficiency for information symbols.

However, in the conventional digital modulation system above, the pilot symbol insertion interval and the information symbol modulation system are fixed. Therefore, when fluctuations in the transmission path are intense or the level of the reception signal of the receiver is small, error resistance during data demodulation reduces and the quality of data deteriorates. On the other hand, when fluctuations in the transmission path are gentle or the level of the reception signal on the receiving side is large, the data transmission efficiency cannot be improved despite the excessive data quality.

SUMMARY OF THE INVENTION

It is an object of the present invention to provide a transmission apparatus, reception apparatus and digital radio communication method capable of flexibly improving the data transmission efficiency and the quality of data.

The present invention attains the above object by changing the interval of inserting a known pilot symbol, binary phase (BPSK: Binary Phase Shift Keying) modulation symbols or quadrature phase (QPSK: Quadrature Phase Shift Keying) modulation symbols and the modulation system of information symbols according to the communication situation such as fluctuations in the transmission path and the level of a reception signal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENT

With reference now to the attached drawings, embodiments of the present invention will be explained in detail below.

Embodiment 1

Embodiment 1 describes a digital radio communication method by which the interval of inserting a known pilot symbol and the modulation system of information symbols are changed according to the communication situation.

Figure 1:
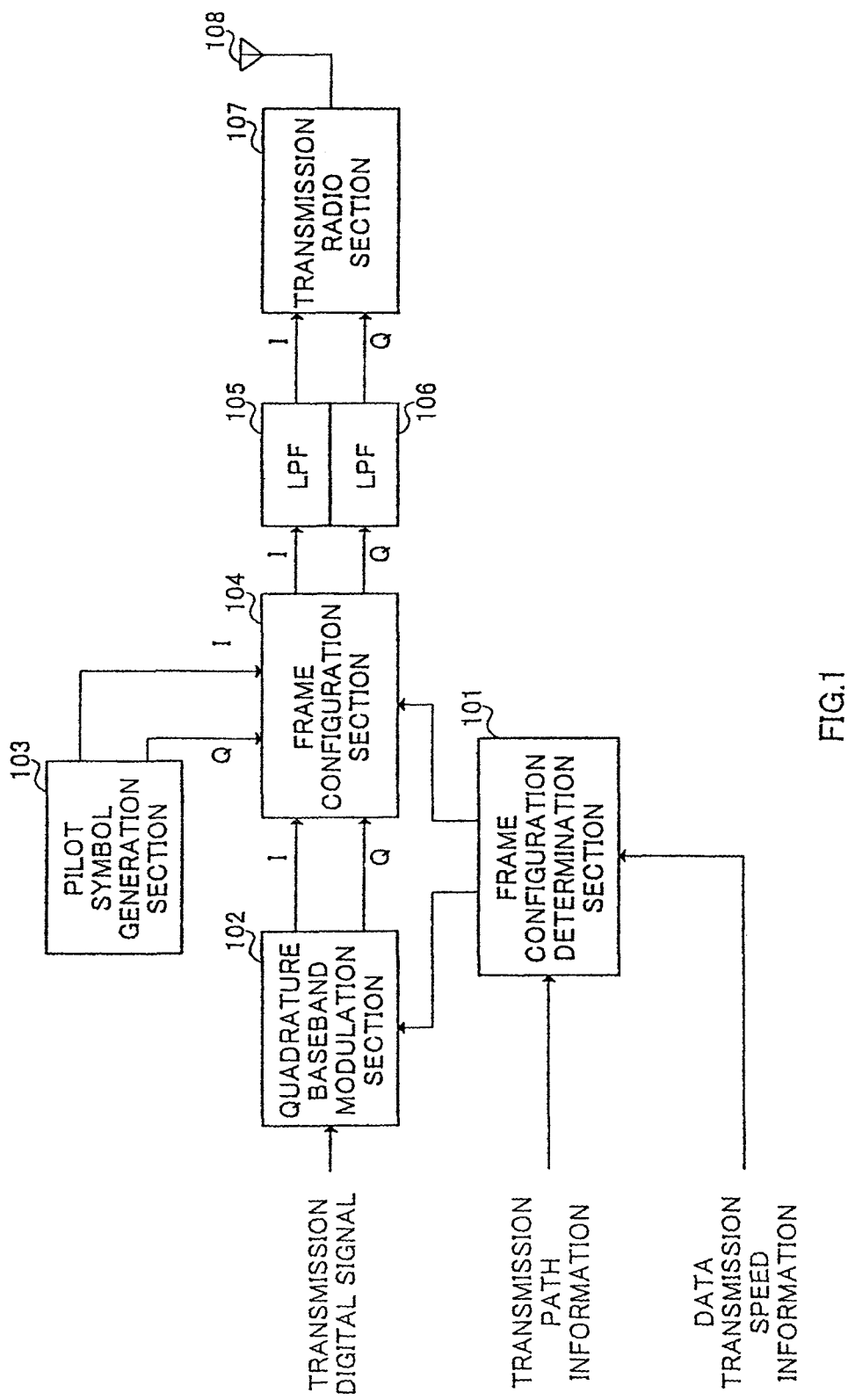
FIG. 1 is a block diagram showing a configuration of a transmission apparatus according to Embodiment 1 of the present invention.

FIG. 1 is a block diagram showing a configuration of a transmission apparatus according to this embodiment. As shown in FIG. 1, the transmission apparatus according to this embodiment mainly consists of frame configuration determination section 101, quadrature baseband modulation section 102, pilot symbol generation section 103, frame configuration section 104, and LPFs (Low Pass Filters) 105 and 106, transmission radio section 107 and transmission antenna 108.

Frame configuration determination section 101 judges the communication situation based on transmission path information which shows the degree of fluctuations of the transmission path due to fading and data transmission speed information which shows the transmission speed of transmission data based on the level of a reception signal and decides the interval of inserting a known pilot symbol and the modulation system of a transmission digital signal. Then, frame configuration determination section 101 outputs a signal indicating the determined modulation system to quadrature baseband modulation section 102 and outputs a signal indicating the determined interval of inserting the known pilot symbol to frame configuration section 104. By the way, details of the method of determining a frame configuration by frame configuration determination section 101 will be described later.

Here, when an identical frequency band is used for the uplink and the downlink, the situation of fluctuations in the transmission path due to fading can be estimated from a transition in the result of measuring the reception level of the modulated signal transmitted from the other end of communication on the receiving side, which is not shown in the figure, of the communication apparatus in which the transmission apparatus shown in FIG. 1 is mounted. Furthermore, the transmission apparatus shown in FIG. 1 can recognize the situation of fluctuations in the transmission path due to fading, by the reception apparatus, which is the other end of communication of the transmission apparatus shown in FIG. 1, measuring the reception level of the modulated signal transmitted from the other end of communication, estimating the situation of fluctuations in the transmission path due to fading based on the transition of the measurement result.

Then, when an identical frequency band is used for the uplink and the downlink, the transmission speed of the transmission data can be determined from a result of measuring the reception level of the modulated signal transmitted from the other end of communication on the receiving side, which is not shown in the figure, of the communication apparatus in which the transmission apparatus shown in FIG. 1 is mounted. Furthermore, the transmission apparatus shown in FIG. 1 can recognize the transmission speed of the transmission data by the reception apparatus, which is the other end of communication of the transmission apparatus shown in FIG. 1, measuring the reception level of the pilot symbol transmitted from the other end of communication and determining the transmission speed of the transmission data based on the measurement result.

Quadrature baseband modulation section 102 modulates a transmission digital signal to a quadrature baseband signal with the modulation system indicated from frame configuration determination section 101 and outputs the in-phase component and the quadrature component of the quadrature baseband signal to frame configuration section 104.

Pilot symbol generation section 103 generates a pilot symbol known between the transmitting and receiving sides and outputs the in-phase component and the quadrature component of the known pilot symbol to frame configuration section 104.

Frame configuration section 104 inserts the known pilot symbol output from pilot symbol generation section 103 into the output signal of quadrature baseband modulation section 102 at the insertion interval instructed from frame configuration determination section 101 and composes a frame.

LPF 105 lets pass only a predetermined frequency band section of the in-phase component output from frame configuration section 104. LPF 106 lets pass only a predetermined frequency band section of the quadrature component output from frame configuration section 104.

Transmission radio section 107 transmits a radio frequency signal as the electric wave from transmission antenna 108 after performing radio processing on the output signals of LPF 105 and LPF 106.

Next, examples of the method of determining a frame configuration by frame configuration determination section 101 of the transmission apparatus shown in FIG. 1 above will be explained.

Figure 2:
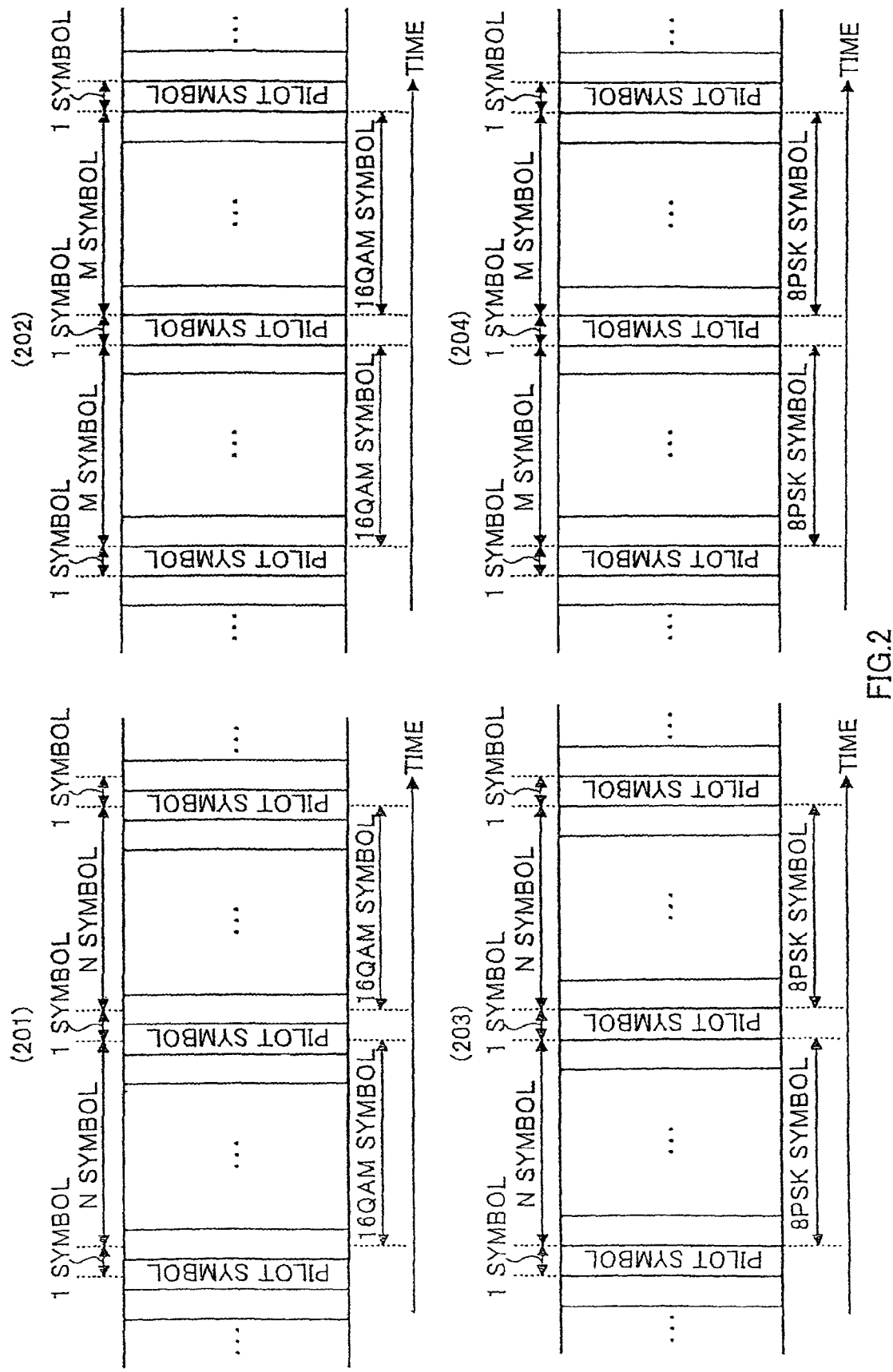
FIG. 2 illustrates examples of a frame configuration of a signal transmitted from the transmission apparatus of Embodiment 1 of the present invention.

FIG. 2 illustrates examples of a frame configuration of a signal transmitted from the transmission apparatus of this embodiment and shows a time-symbol relationship. (201) is a frame configuration when the modulation system of information symbols is 16-value quadrature amplitude modulation (16QAM: 16 Quadrature Amplitude Modulation) and a known pilot symbol interval is N symbols. (202) is a frame configuration when the modulation system of information symbols is 16QAM and a known pilot symbol interval is M symbols. (203) is a frame configuration when the modulation system of information symbols is 8 phases (8PSK: 8 Phase Shift Keying) modulation and a known pilot symbol interval is N symbols. (204) is a frame configuration when the modulation system of information symbols is 8PSK modulation and a known pilot symbol interval is M symbols. Suppose N<M at this time.

Frame configuration determination section 101 selects one of (201), (202), (203) or (204) in FIG. 2 as the optimal frame configuration based on the transmission path information and the request data transmission speed information.

For example, in the case of high-speed fading, frame configuration determination section 101 sacrifices data transmission efficiency on the receiving side and selects a frame configuration of either (201) or (203) in FIG. 2 so that the interval of inserting a known pilot symbol becomes narrower to prevent deterioration of the data demodulation error rate and maintain the quality of data. On the other hand, in the case of low-speed fading, frame configuration determination section 101 selects a frame configuration of either (202) or (204) in FIG. 2 to widen the interval of inserting a known pilot symbol to improve the data transmission efficiency.

Also, when the level of the reception signal is large, frame configuration determination section 101 gives priority to data transmission efficiency on the receiving side and selects a frame configuration of either (201) or (202) in FIG. 2 adopting 16QAM as the modulation system of information symbols. On the other hand, when the level of the reception signal is small, frame configuration determination section 101 gives priority to increasing error resistance while sacrificing data transmission efficiency on the receiving side and selects a frame configuration of either (203) or (204) in FIG. 2 adopting 8PSK as the modulation system of information symbols.

Figure 3:
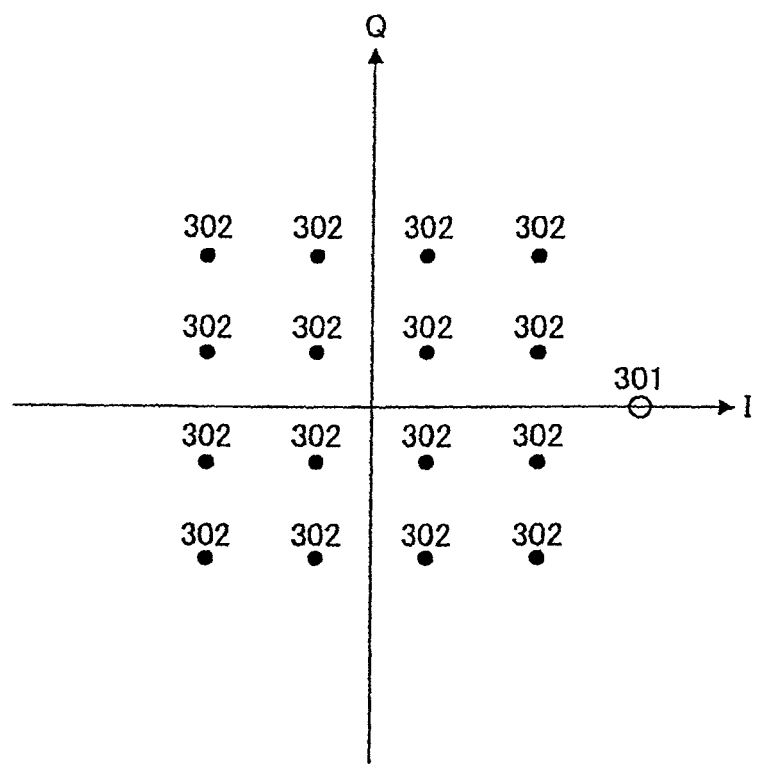
FIG. 3 is a layout of signal points of 16QAM and a known pilot symbol on an in-phase I—quadrature Q plane.
Figure 4:
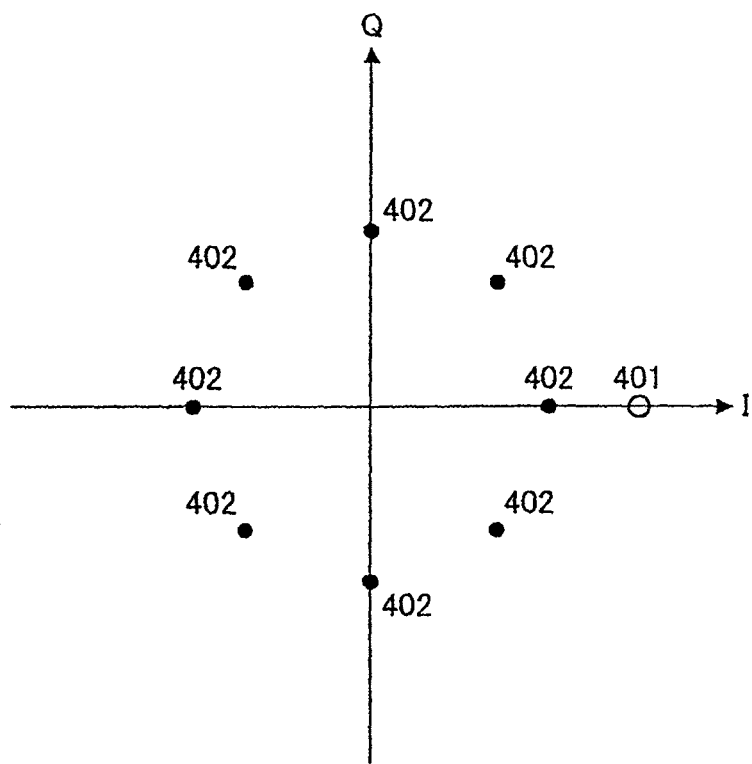
FIG. 4 is a layout of signal points of 8PSK modulation and a known pilot symbol on an in-phase I—quadrature Q plane.

FIG. 3 shows a signal point layout according to the 16QAM modulation system on the in-phase I—quadrature Q plane and signal point layout of a known pilot symbol. Signal point 301 is the signal point of a known pilot symbol and signal points 302 are the signal points of 16QAM modulation symbols. FIG. 4 shows a signal point layout according to the 8PSK modulation system on the in-phase I—quadrature Q plane and signal point layout of a known pilot symbol. Signal point 401 is the signal point of a known pilot symbol and signal points 402 are the signal points of 8PSK modulation symbols.

Figure 5:
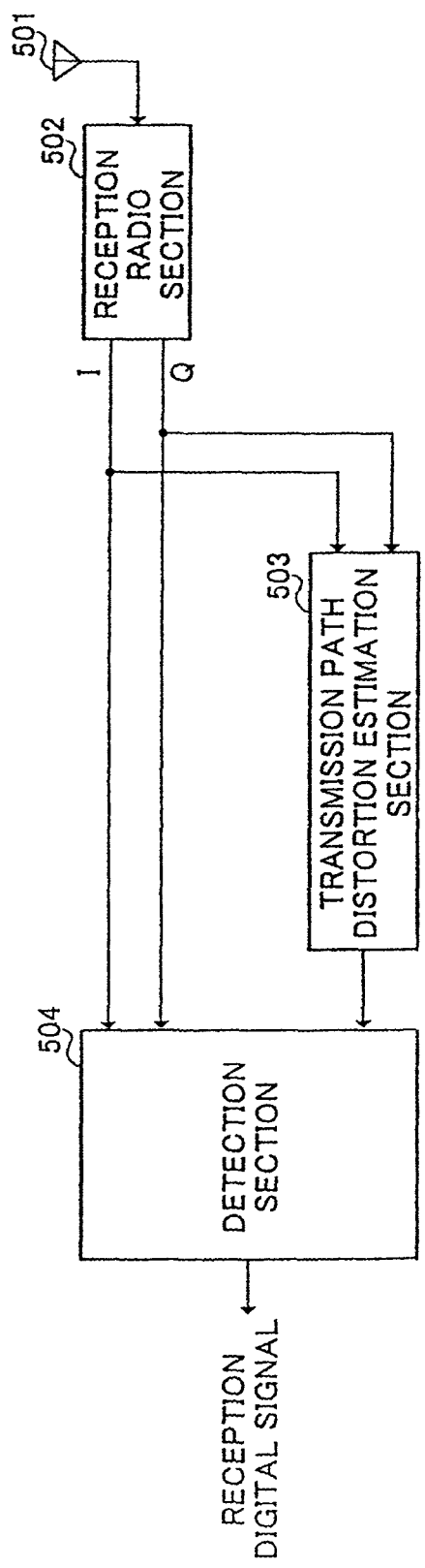
FIG. 5 is a block diagram showing a configuration of a reception apparatus according to Embodiment 1 of the present invention.

FIG. 5 is a block diagram showing a configuration of the reception apparatus according to this embodiment. As shown in FIG. 5, the reception apparatus according to this Embodiment mainly consists of reception antenna. 501, reception radio section 502, transmission path distortion estimation section 503 and detection section 504.

Reception radio section 502 receives the radio signal received by reception antenna 501 as an input, performs predetermined radio processing and outputs the in-phase component and the quadrature component of the reception quadrature baseband signal.

Transmission path distortion estimation section 503 receives the in-phase component and the quadrature component of the quadrature baseband signal as inputs, extracts the signal of the known pilot symbol shown in FIG. 3 and FIG. 4 above, estimates the amount of transmission path distortion from the reception condition of the known pilot symbol and outputs the amount of transmission path distortion to detection section 504.

Detection section 504 receives the in-phase component and the quadrature component of the quadrature baseband signal as inputs, detects information symbols based on the amount of transmission path distortion and outputs a reception digital signal.

Thus, changing the interval of inserting a known pilot symbol and the modulation system of information symbols according to the communication situation such as fluctuations in the transmission path and the level of the reception signal can improve both the data transmission efficiency and the quality of data at the same time.

Here, this embodiment explains two kinds of the interval of inserting a known pilot symbol, but the present invention is not limited to this. Furthermore, this embodiment explains two kinds of the modulation system of information symbols, 16QAM and the 8PSK modulation, but the present invention is not limited to this.

Furthermore, this embodiment only explains the frame configuration of information symbols and a known pilot symbol shown in FIG. 2, but since it is also possible to consider a frame configuration in which signals such as a symbol for synchronization to adjust timing between the receiver and transmitter and a symbol to correct an error on the receiver side are inserted, the present invention is not limited to the frame configuration composed of only information symbols and known pilot symbol.

Embodiment 2

Embodiment 2 describes a digital radio communication method by which the interval of inserting a BPSK modulation symbol and the modulation system of information symbols other than the above BPSK modulation symbol are changed according to the communication situation.

Figure 6:
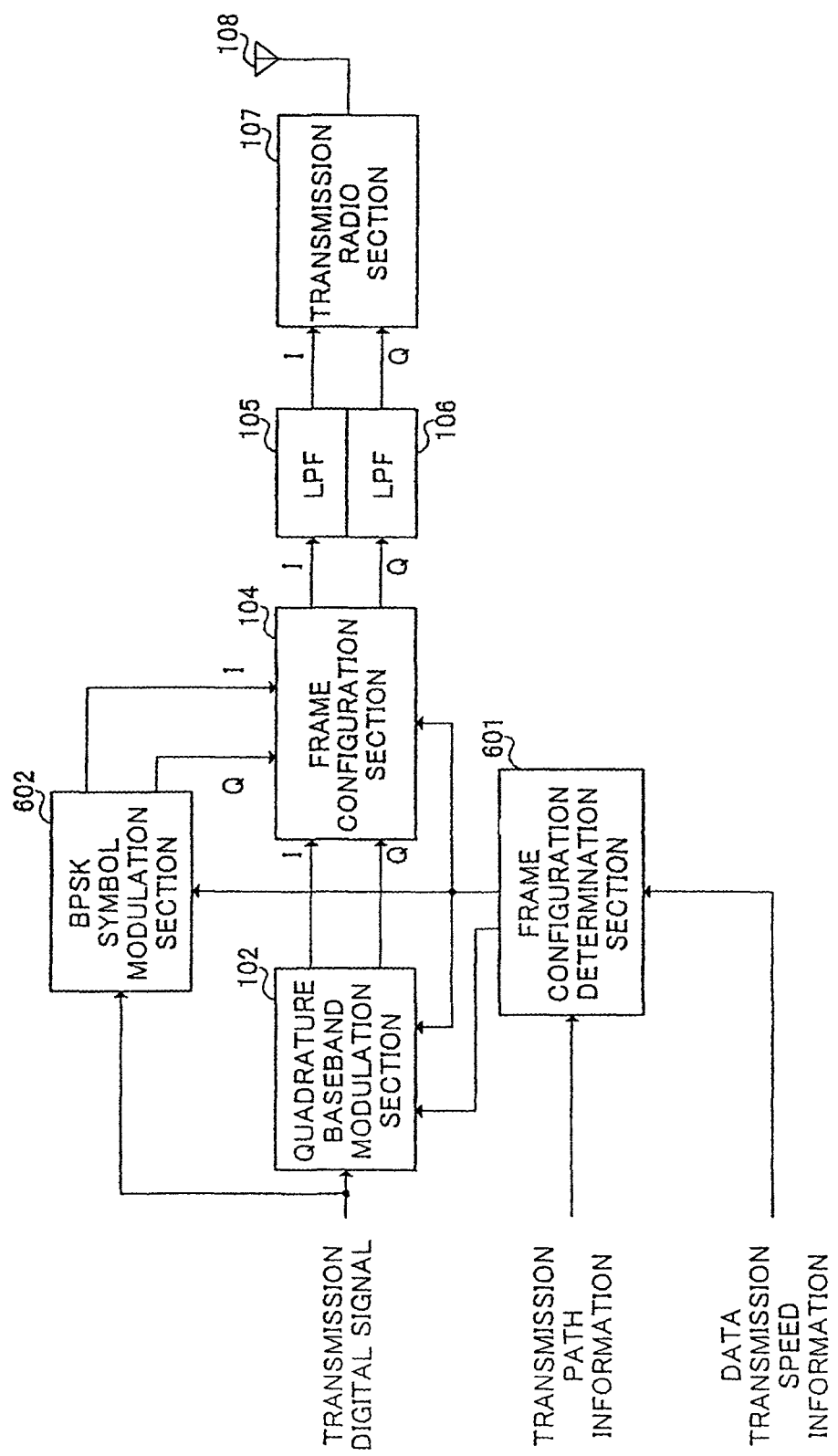
FIG. 6 is a block diagram showing a configuration of a transmission apparatus according to Embodiment 2 of the present invention.

FIG. 6 is a block diagram showing a configuration of the transmission apparatus according to this Embodiment. Here, in the transmission apparatus shown in FIG. 6, the components common to those in the transmission apparatus shown in FIG. 1 are assigned the same reference numerals as those in FIG. 1 and their explanations will be omitted.

In the transmission apparatus in FIG. 6, frame configuration determination section 601 differs in the way of operation from the frame configuration determination section 101 in FIG. 1. Also, when compared to FIG. 1, the transmission apparatus in FIG. 6 adopts the configuration with BPSK symbol modulation section 602, instead of pilot symbol generation section 103, added.

Frame configuration determination section 601 judges the communication situation, determines the interval of inserting a BPSK modulation symbol and the modulation system of a transmission digital signal, outputs a signal indicating the determined modulation system to quadrature baseband modulation section 102 and outputs a signal indicating the interval of inserting the determined BPSK modulation symbol to quadrature baseband modulation section 102, BPSK symbol modulation section 602 and frame configuration section 104.

BPSK symbol modulation section 602 performs BPSK-modulation on the transmission digital signal at the timing indicated from frame configuration determination section 601 and outputs the in-phase component and the quadrature component of the BPSK modulation symbol to frame configuration section 104.

Figure 7:
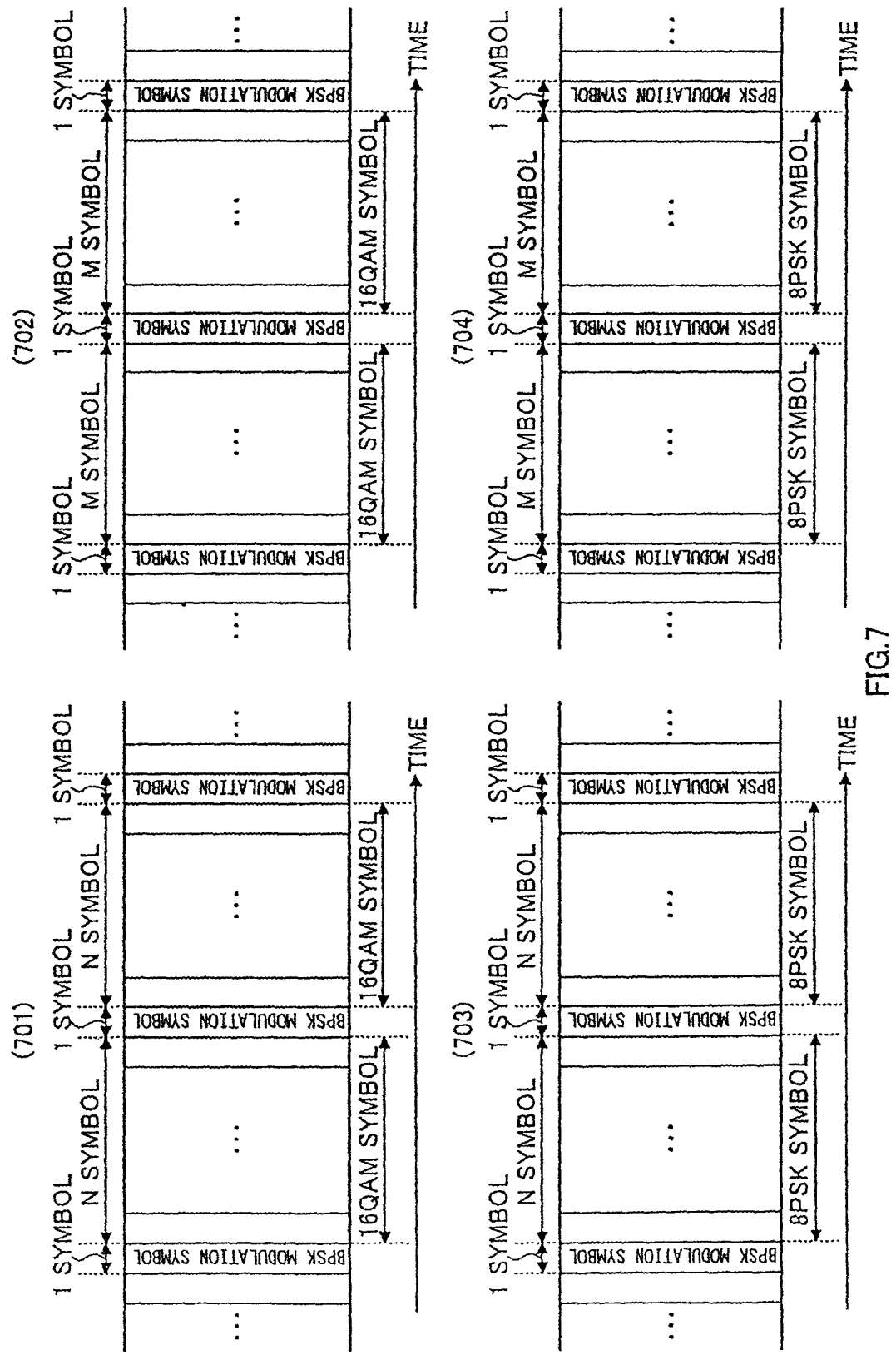
FIG. 7 illustrates examples of a frame configuration of a signal transmitted from the transmission apparatus of Embodiment 2 of the present invention.

FIG. 7 illustrates examples of a frame configuration of a signal transmitted from the transmission apparatus of this embodiment and shows a time-symbol relationship. (701) is a frame configuration when the modulation system of information symbols is 16QAM and a BPSK modulation symbol interval is N symbols. (702) is a frame configuration when the modulation system of information symbols is 16QAM and a BPSK modulation symbol interval is M symbols. (703) is a frame configuration when the modulation system of information symbols is 8PSK modulation and a BPSK modulation symbol interval is N symbols. (704) is a frame configuration when the modulation system of information symbols is 8PSK modulation and a BPSK modulation symbol interval is M symbols. Suppose N<M at this time.

Frame configuration determination section 601 selects one of (701), (702), (703) or (704) in FIG. 7 as the optimal frame configuration based on the transmission path information and the request data transmission speed information.

For example, in the case of high-speed fading, frame configuration determination section 601 sacrifices data transmission efficiency on the receiving side and selects a frame configuration of either (701) or (703) in FIG. 7 so that the interval of inserting a BPSK modulation symbol becomes narrower to prevent deterioration of the data demodulation error rate and maintain the quality of data. On the other hand, in the case of low-speed fading, frame configuration determination section 601 selects a frame configuration of either (702) or (704) in FIG. 7 to widen the interval of inserting a BPSK modulation symbol to improve the data transmission efficiency.

Furthermore, when the level of the reception signal is large, frame configuration determination section 601 gives priority to data transmission efficiency on the receiving side and selects a frame configuration of either (701) or (702) in the FIG. 7 adopting 16QAM as the modulation system of information symbols. On the other hand, when the level of the reception signal is small, frame configuration determination section 601 gives priority to increasing error resistance while sacrificing data transmission efficiency on the receiving side and selects a frame configuration of either (703) or (704) in FIG. 7 adopting 8PSK as the modulation system of information symbols.

Figure 8:
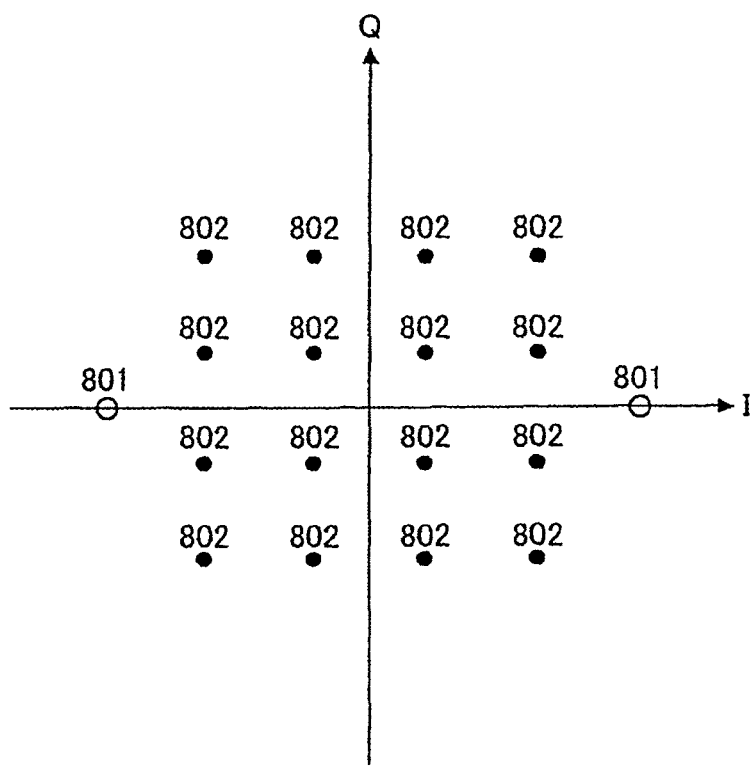
FIG. 8 is a layout of signal points of 16QAM and BPSK modulation on an in-phase I—quadrature Q plane.
Figure 9:
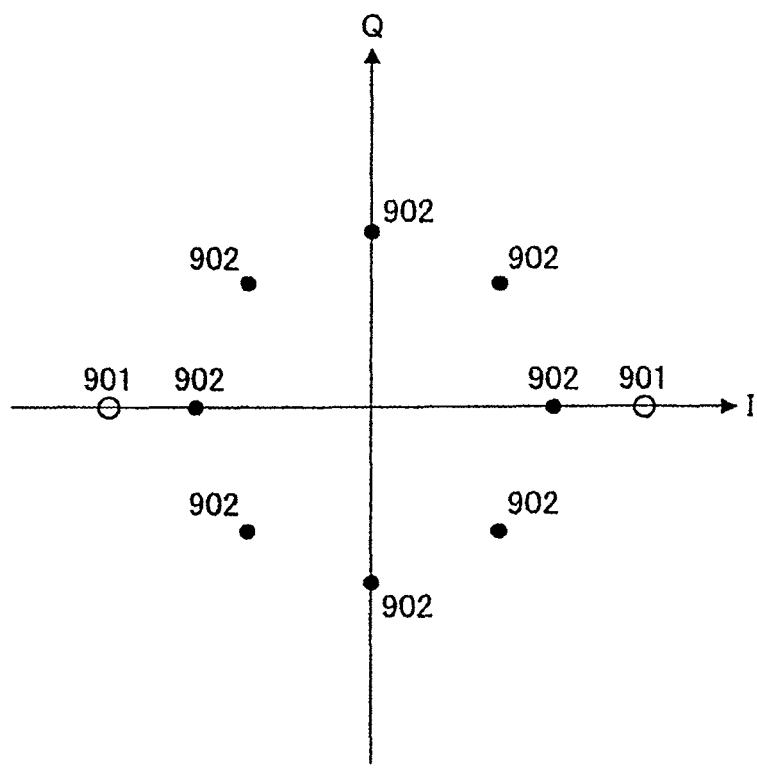
FIG. 9 is a layout of signal points of 8PSK modulation and BPSK modulation on an in-phase I—quadrature Q plane.

FIG. 8 shows a signal point layout according to the 16QAM modulation system on the in-phase I—quadrature Q plane and signal point layout of BPSK modulation symbols. Signal points 801 are the signal points of BPSK modulation symbols and signal points 802 are the signal points of 16QAM modulation symbols. FIG. 9 shows a signal point layout according to the 8PSK modulation system on the in-phase I—quadrature Q plane and signal point layout of BPSK modulation symbols. Signal points 901 are the signal points of BPSK modulation symbols and signal points 902 are the signal points of 8PSK modulation symbols.

Figure 10:
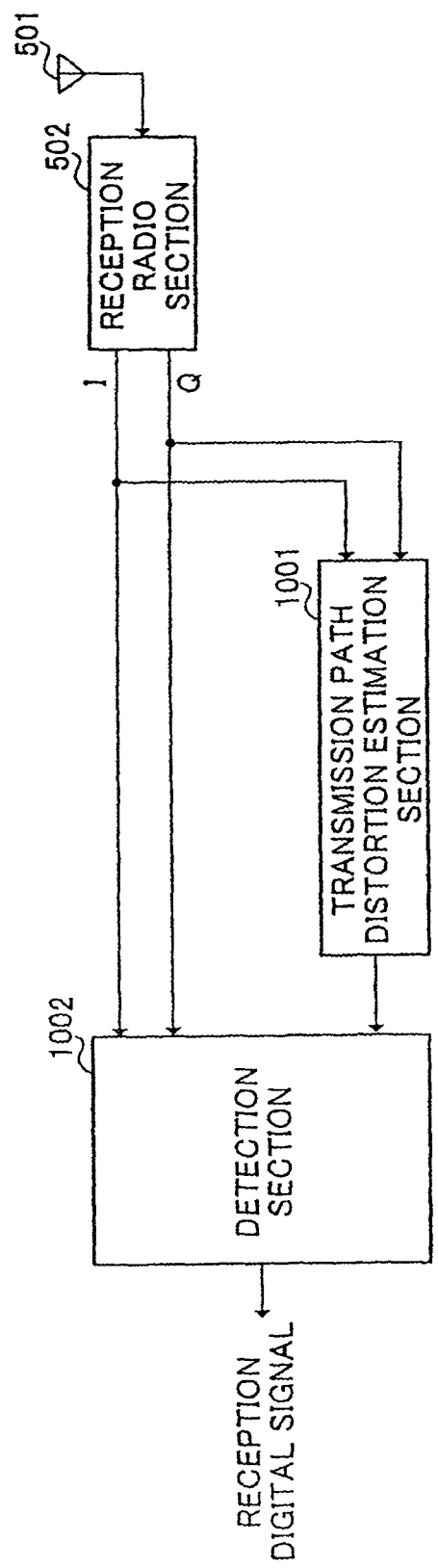
FIG. 10 is a block diagram showing a configuration of a reception apparatus according to Embodiment 2 of the present invention.

FIG. 10 is a block diagram showing a configuration of the reception apparatus according to this Embodiment. In the reception apparatus shown in FIG. 10, the components common to the reception apparatus shown in FIG. 5 are assigned the same reference numerals as those in FIG. 5 and their explanations will be omitted.

In the reception apparatus in FIG. 10, transmission path distortion estimation section 1001 differs in the way of operation from transmission path distortion estimation section 503 in FIG. 5 and detection section 1002 differs in the way of operation from detection section 504 in FIG. 5.

Transmission path distortion estimation section 1001 receives the in-phase component and the quadrature component of the quadrature baseband signal as inputs, extracts the signals of the BPSK modulation symbols shown in FIG. 8 and FIG. 9 above, estimates the amount of transmission path distortion from the reception condition of the BPSK modulation symbols and outputs the amount of transmission path distortion to detection section 1002.

Detection section 1002 receives the in-phase component and the quadrature component of the quadrature baseband signal as inputs, detects information symbols and BPSK modulation symbols based on the amount of transmission path distortion and outputs a reception digital signal.

Thus, in this embodiment, by sending information with BPSK modulation symbols, instead of a known pilot symbol, inserted, it is possible to improve the transmission speed compared with Embodiment 1.

Here, this embodiment describes two kinds of the interval of inserting BPSK modulation symbols but the present invention is not limited to this. Also, this embodiment describes two kinds of the modulation system of information symbols, 16QAM and 8PSK modulation, but the present invention is not limited to this.

Furthermore, this embodiment describes the frame configuration of only information symbols and BPSK modulation symbols shown in FIG. 7 but the present invention is not limited to this frame configuration.

Embodiment 3

Embodiment 3 describes a digital radio communication method by which the interval of inserting QPSK modulation symbols and the modulation system of information symbols other than the above QPSK modulation symbols are changed according to the communication situation.

Figure 11:
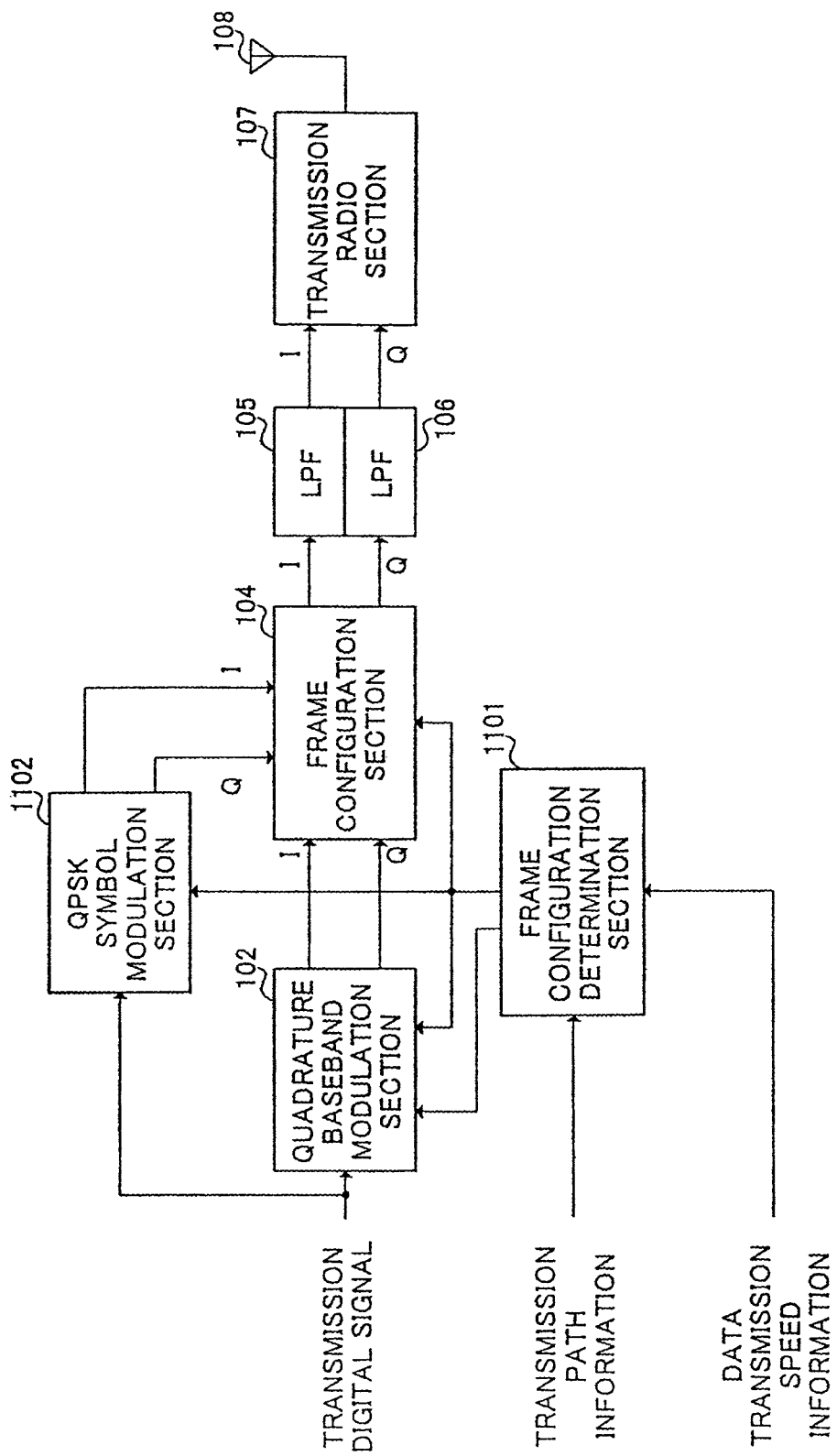
FIG. 11 is a block diagram showing a configuration of a transmission apparatus according to Embodiment 3 of the present invention.

FIG. 11 is a block diagram showing a configuration of the transmission apparatus according to this Embodiment. In the transmission apparatus shown in FIG. 11, the components common to those in the transmission apparatus shown in FIG. 1 are assigned the same reference numerals as those in FIG. 1 and their explanations will be omitted.

In the transmission apparatus in FIG. 11, frame configuration determination section 1101 differs in the way of operation from the frame configuration determination section 101 in FIG. 1. Also, when compared to FIG. 1, the transmission apparatus in FIG. 11 adopts a configuration with QPSK symbol modulation section 1102, instead of pilot symbol generation section 103, added.

Frame configuration determination section 1101 judges the communication situation, determines the interval of inserting QPSK modulation symbols and the modulation system of a transmission digital signal, outputs a signal indicating the determined modulation system to quadrature baseband modulation section 102 and outputs a signal indicating the determined interval of inserting QPSK modulation symbols to quadrature baseband modulation section 102, QPSK symbol modulation section 1102 and frame configuration section 104.

QPSK symbol modulation section 1102 performs QPSK-modulation on a transmission digital signal at the timing indicated from frame configuration determination section 1101 and outputs the in-phase component and the quadrature component of the QPSK modulation symbol to frame configuration section 104.

Figure 12:
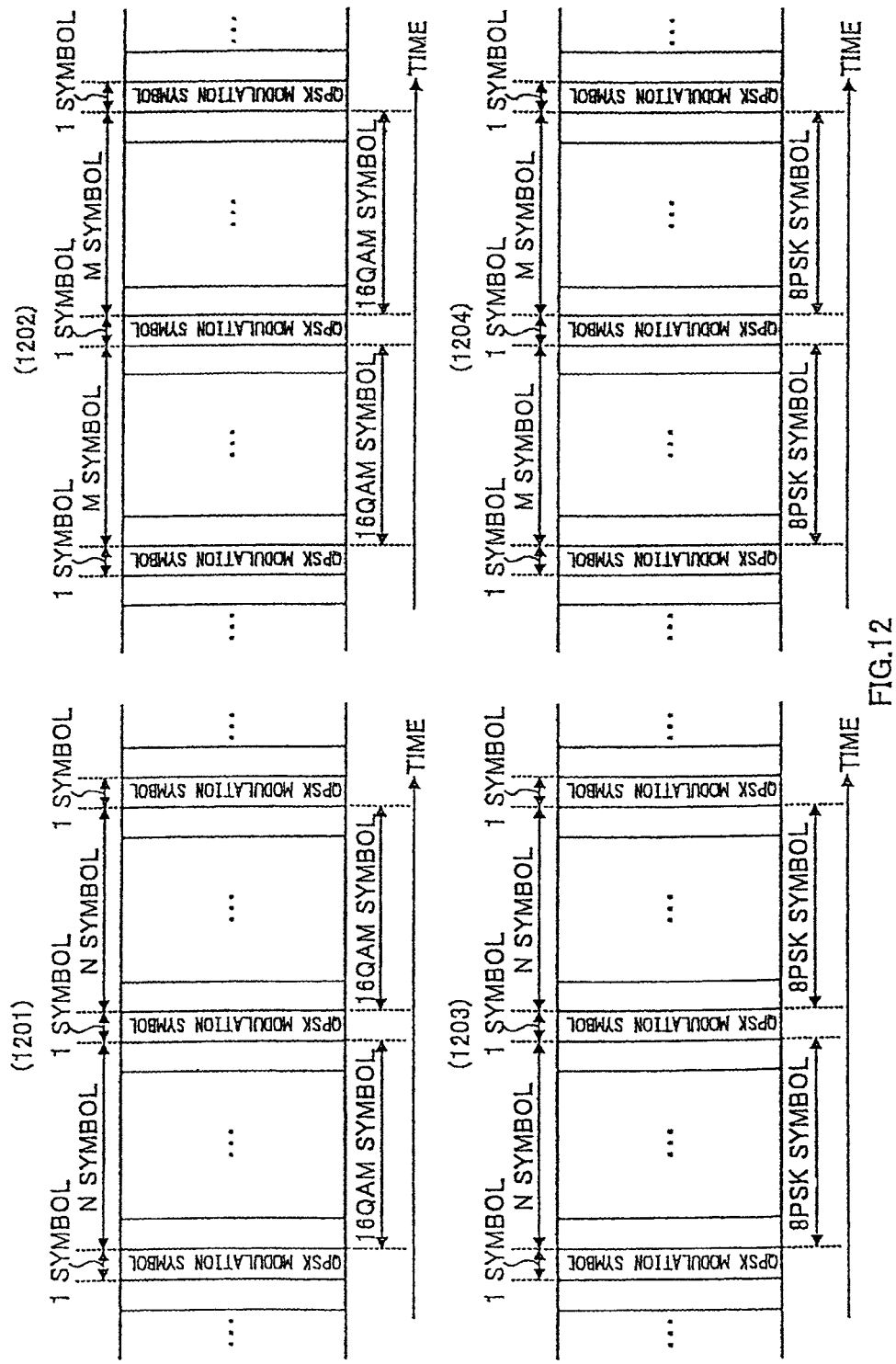
FIG. 12 illustrates examples of a frame configuration of a signal transmitted from the transmission apparatus of Embodiment 3 of the present invention.

FIG. 12 illustrates examples of a frame configuration of a signal transmitted from the transmission apparatus of this embodiment and shows a time-symbol relationship. (1201) is a frame configuration when the modulation system of information symbols is 16QAM and a QPSK modulation symbol interval is N symbols. (1202) is a frame configuration when the modulation system of information symbols is 16QAM and a QPSK modulation symbol interval is M symbols. (1203) is a frame configuration when the modulation system of information symbols is 8PSK modulation and a QPSK modulation symbol interval is N symbols. (1204) is a frame configuration when the modulation system of information symbols is 8PSK modulation and a QPSK modulation symbol interval is M symbols. Suppose N<M at this time.

Frame configuration determination section 1101 selects one of (1201), (1202), (1203) or (1204) in FIG. 12 as the optimal frame configuration based on the transmission path information and the request data transmission speed information.

For example, in the case of high-speed fading, frame configuration determination section 1101 sacrifices data transmission efficiency on the receiving side and selects a frame configuration of either (1201) or (1203) in FIG. 12 so that the QPSK modulation symbol insertion interval becomes narrower to prevent deterioration of the data demodulation error rate and maintain the quality of data. On the other hand, in the case of low-speed fading, frame configuration determination section 1101 selects a frame configuration of either (1202) or (1204) in FIG. 12 to widen the interval of inserting QPSK modulation symbols to improve the data transmission efficiency.

Furthermore, when the level of the reception signal is large, frame configuration determination section 1101 gives priority to data transmission efficiency on the receiving side and selects a frame configuration of either (1201) or (1202) in FIG. 12 adopting 16QAM as the modulation system of information symbols. On the other hand, when the level of the reception signal is small, frame configuration determination section 1101 gives priority to increasing error resistance while sacrificing data transmission efficiency on the receiving side and selects a frame configuration of either (1203) or (1204) in FIG. 12 adopting 8PSK as the modulation system of information symbols.

Figure 13:
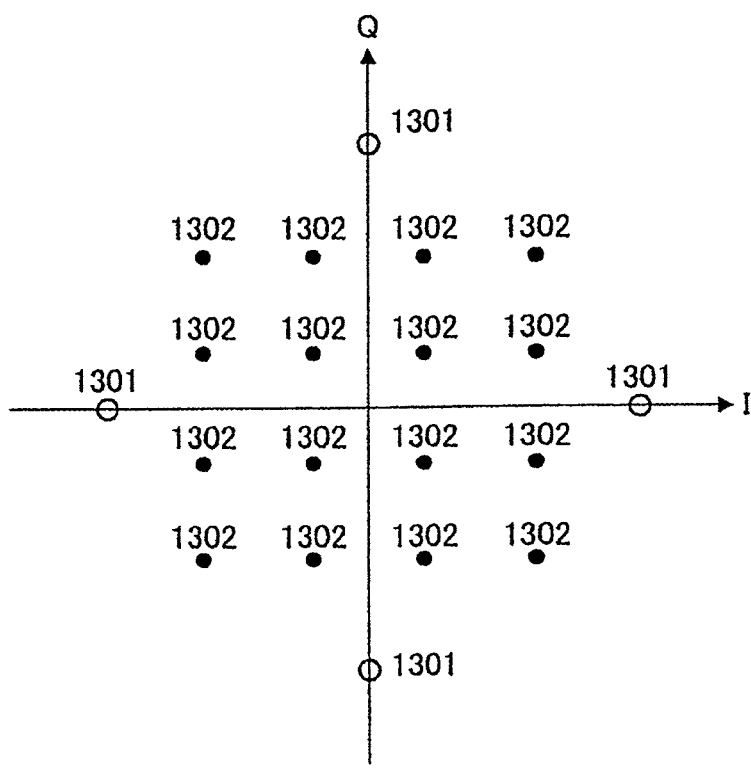
FIG. 13 is a layout of signal points of 16QAM and QPSK modulation on an in-phase I—quadrature Q plane.
Figure 14:
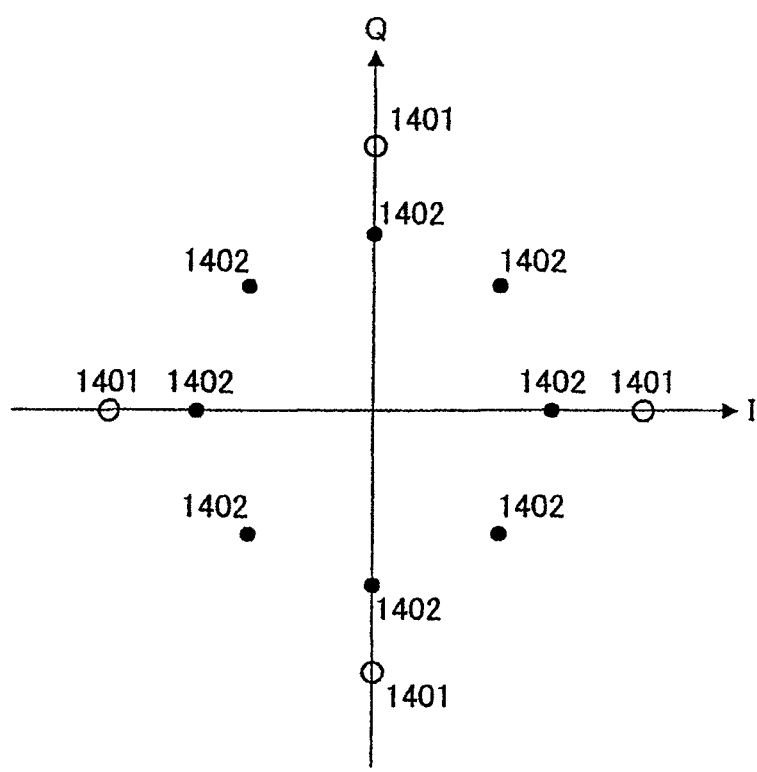
FIG. 14 is a layout of signal points of 8PSK modulation and QPSK modulation on an in-phase I—quadrature Q plane.

FIG. 13 shows a signal point layout according to the 16QAM modulation system on the in-phase I—quadrature Q plane and signal point layout of QPSK modulation symbols. Signal points 1301 are the signal points of QPSK modulation symbols and signal points 1302 are the signal points of 16QAM modulation symbols. FIG. 14 shows a signal point layout according to the 8PSK modulation system on the in-phase I—quadrature Q plane and signal point layout of QPSK modulation symbols. Signal points 1401 are the signal points of QPSK modulation symbols and signal points 1402 are the signal points of 8PSK modulation symbols.

Figure 15:
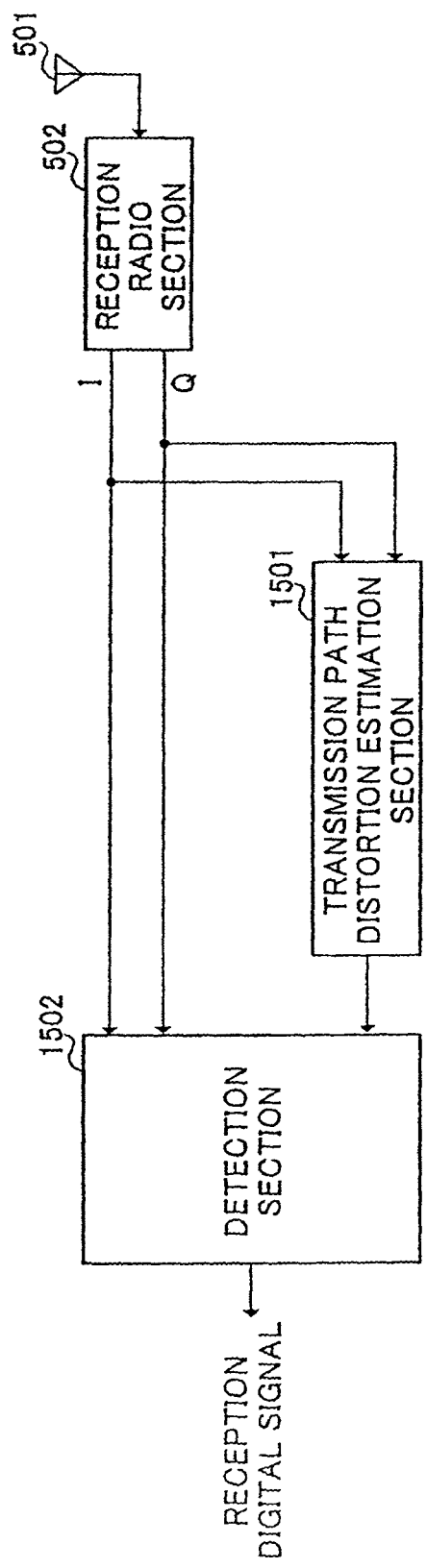
FIG. 15 is a block diagram showing a configuration of a reception apparatus according to Embodiment 3 of the present invention.

FIG. 15 is a block diagram showing a configuration of the reception apparatus according to this embodiment. In the reception apparatus shown in FIG. 15, the components common to the reception apparatus shown in FIG. 5 are assigned the same reference numerals as those in FIG. 5 and their explanations will be omitted.

In the reception apparatus in FIG. 15, transmission path distortion estimation section 1501 differs in the way of operation from transmission path distortion estimation section 503 in FIG. 5 and detection section 1502 differs in the way of operation from detection section 504 in FIG. 5.

Transmission path distortion estimation section 1501 receives the in-phase component and the quadrature component of the quadrature baseband signal as inputs, extracts the signals of the QPSK modulation symbols shown in FIG. 13 and FIG. 14 above, estimates the amount of transmission path distortion from the reception condition of the QPSK modulation symbols and outputs the amount of transmission path distortion to detection section 1502.

Detection section 1502 receives the in-phase component and the quadrature component of the quadrature baseband signal as inputs, detects information symbols and QPSK modulation symbols based on the amount of transmission path distortion and outputs a reception digital signal.

Thus, in this embodiment, by sending information with QPSK modulation symbols, instead of a known pilot symbol, inserted, it is possible to improve the transmission speed compared with Embodiment 1 and Embodiment 2.

Here, this embodiment describes two kinds of the interval of inserting QPSK modulation symbols but the present invention is not limited to this. Also, this embodiment describes two kinds of the modulation system of information symbols, 16QAM and 8PSK modulation, but the present invention is not limited to this.

Furthermore, this embodiment describes the frame configuration of only information symbols and QPSK modulation symbols shown in FIG. 12 but the present invention is not limited to this frame configuration.

Embodiment 4

Embodiment 4 describes a digital radio communication method by which the modulation system of information symbols is changed according to the communication situation and when the modulation system of information symbols uses 8 or more values, a known pilot symbol is inserted with the insertion interval changed according to the communication situation.

Figure 16:
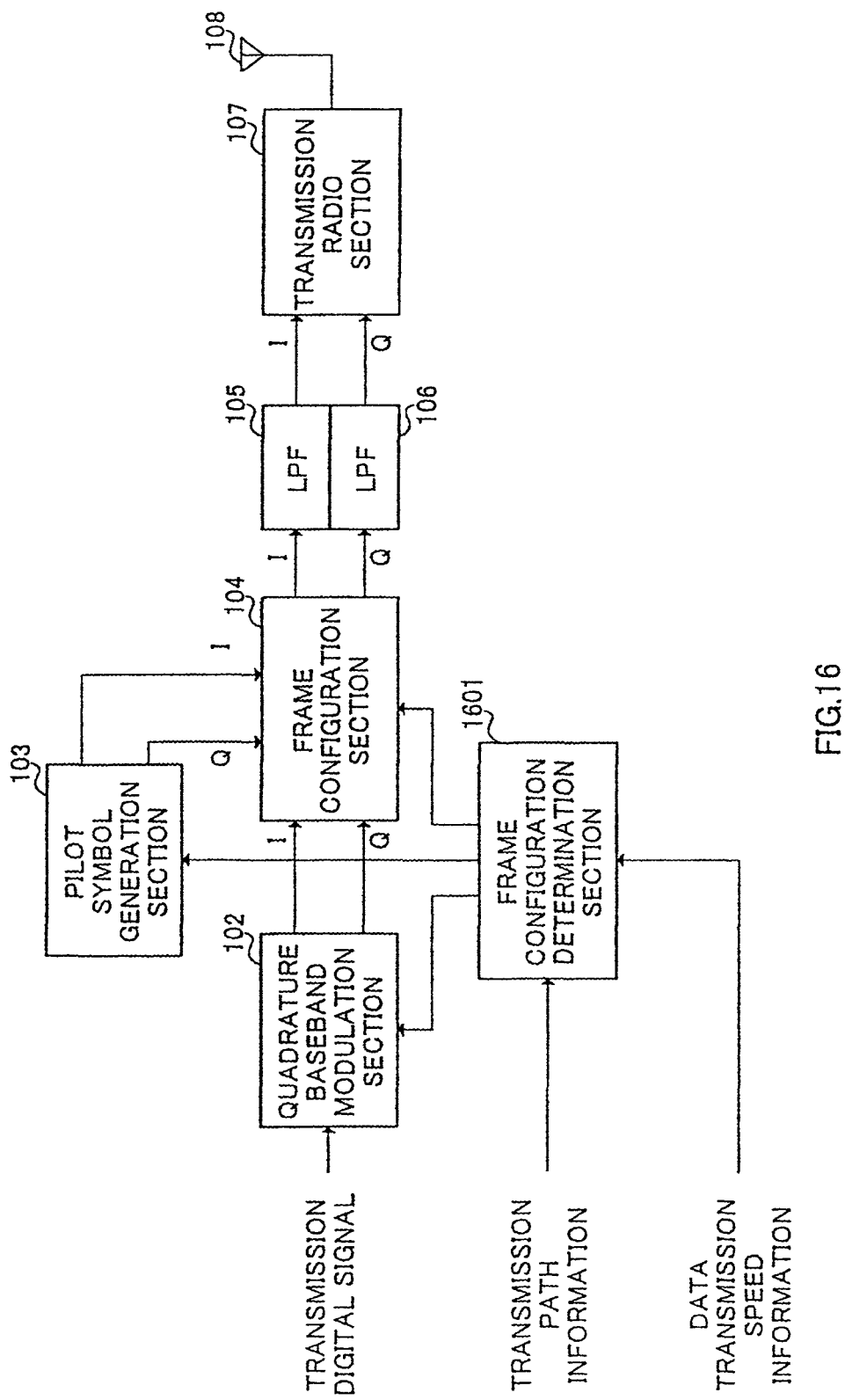
FIG. 16 is a block diagram showing a configuration of a transmission apparatus according to Embodiment 4 of the present invention.

FIG. 16 is a block diagram showing a configuration of the transmission apparatus according to this Embodiment. In the transmission apparatus shown in FIG. 16, the components common to those in the transmission apparatus shown in FIG. 1 are assigned the same reference numerals as those in FIG. 1 and their explanations will be omitted.

In the transmission apparatus in FIG. 16, frame configuration determination section 1601 differs in the way of operation from the frame configuration determination section 101 in FIG. 1.

Frame configuration determination section 1601 determines the modulation system of a transmission digital signal based on the communication situation and outputs a signal indicating the determined modulation system to quadrature baseband modulation section 102. Also, when the determined modulation system uses 8 or more values, frame configuration determination section 1601 determines the interval of inserting a pilot symbol based on the communication situation and outputs a signal indicating the determined interval of inserting the pilot symbol to frame configuration section 104. Also, when the determined modulation system uses 8 fewer values, frame configuration determination section 1601 outputs a signal giving an instruction for stopping the generation of pilot symbols to pilot symbol generation section 103.

Pilot symbol generation section 103 generates a pilot symbol known between the transmitting and receiving sides and outputs the in-phase component and the quadrature component of the known pilot symbol to frame configuration section 104. However, when instructed to stop the generation of pilot symbols from frame configuration determination section 1601, pilot symbol generation section 103 stops operation.

Figure 17:
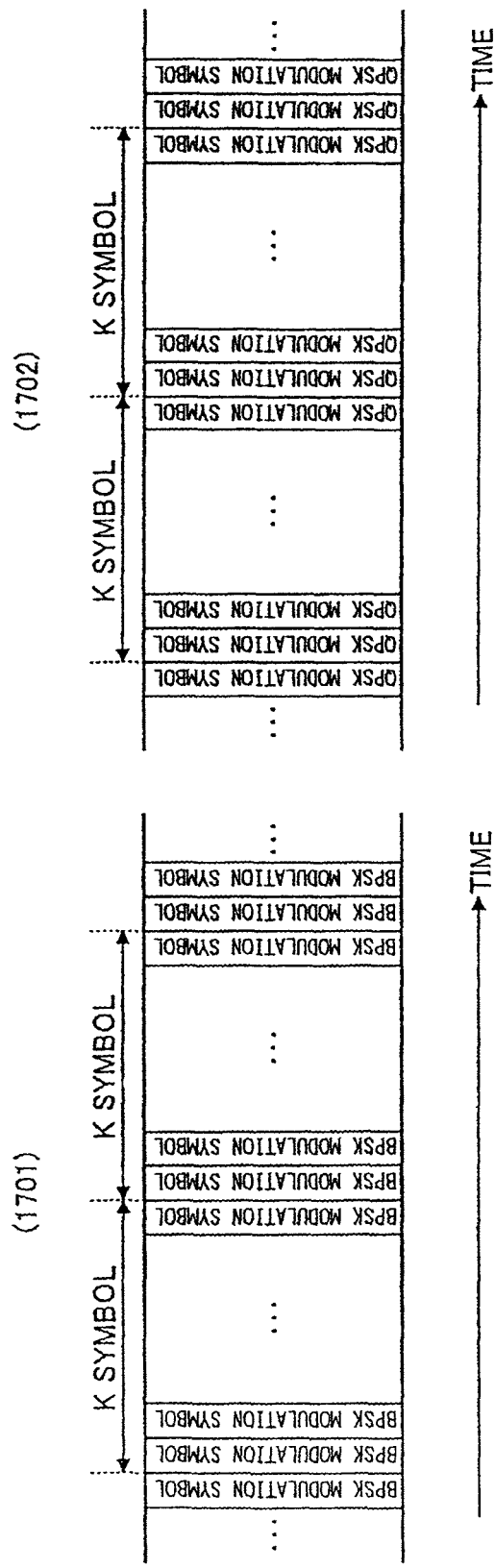
FIG. 17 illustrates examples of a frame configuration of a signal transmitted from the transmission apparatus of Embodiment 4 of the present invention.

FIG. 17 illustrates examples of a frame configuration of a signal transmitted from the transmission apparatus of this embodiment and shows a time-symbol relationship. (1701) is a frame configuration when the modulation system of information symbols is BPSK. (1702) is a frame configuration when the modulation system of information symbols is QPSK.

The ranking of the frame configurations shown in FIG. 2 and FIG. 17 in descending order of resistance to fading speed is (1701), (1702), (203), (201), (204) and (202). Furthermore, the ranking in descending order of error resistance is (1701), (1702), (203), (204), (201) and (202). On the other hand, the ranking in descending order of data transmission efficiency on the receiving side is (202), (201), (204), (203), (1702) and (1701).

Frame configuration determination section 1601 selects one of (201), (202), (203) or (204) in FIG. 2 or (1701) or (1702) in FIG. 17 above as the optimal frame configuration based on the transmission path information and the request data transmission speed information.

Figure 18:
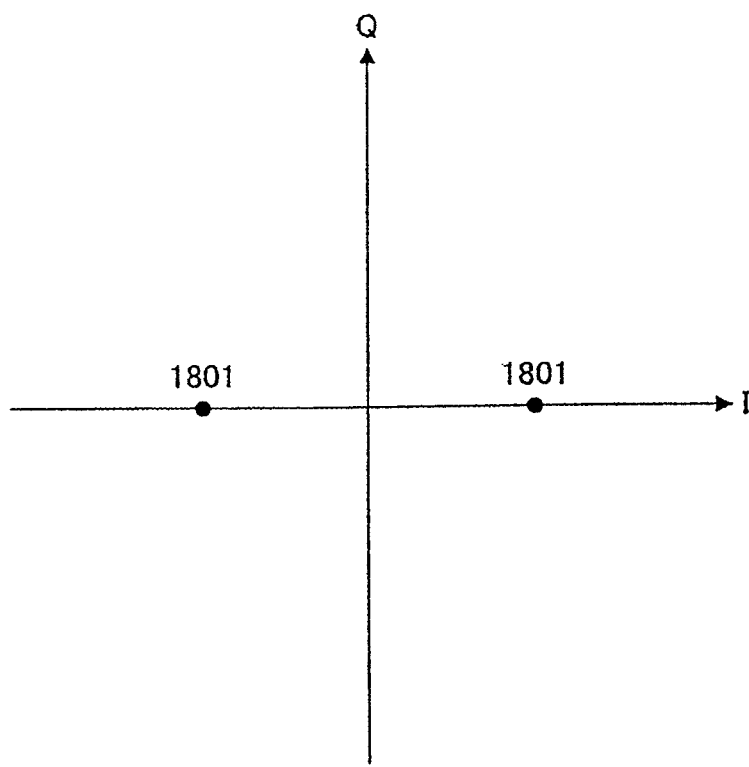
FIG. 18 is a layout of signal points of BPSK modulation on an in-phase I—quadrature Q plane.

FIG. 18 shows a signal point layout according to the BPSK modulation method on the in-phase I—quadrature Q plane and signal points 1801 are the signal points of BPSK symbols.

Figure 19:
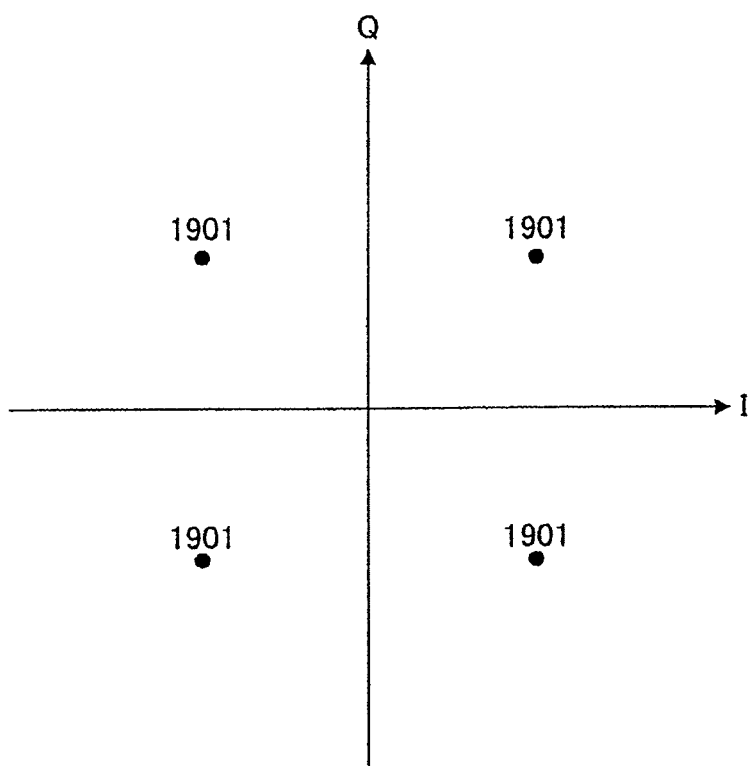
FIG. 19 is a layout of signal points of QPSK modulation on an in-phase I—quadrature Q plane.

FIG. 19 shows a signal point layout according to the QPSK modulation method on the in-phase I—quadrature Q plane and signal points 1901 are the signal points of QPSK symbols.

Figure 20:
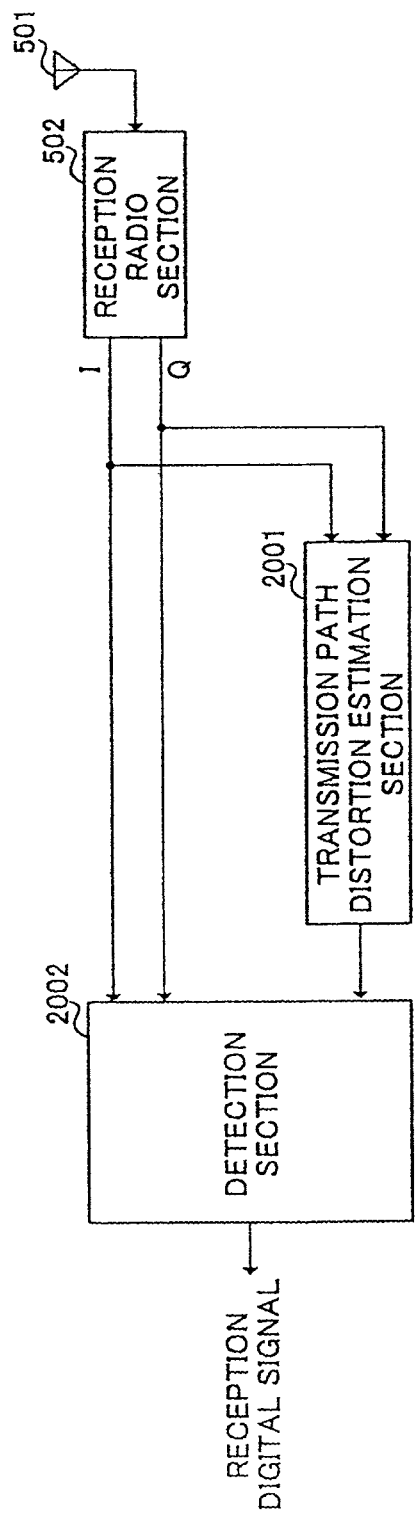
FIG. 20 is a block diagram showing a configuration of a reception apparatus according to Embodiment 4 of the present invention.

FIG. 20 is a block diagram showing a configuration of the reception apparatus according to this embodiment. In the reception apparatus shown in FIG. 20, the components common to those in the reception apparatus shown in FIG. 5 are assigned the same reference numerals as those in FIG. 5 and their explanations will be omitted.

In the reception apparatus in FIG. 20, transmission path distortion estimation section 2001 differs in the way of operation from transmission path estimation section 503 in FIG. 5 and detection section 2002 differs in the way of operation from detection section 504 in FIG. 5.

Transmission path distortion estimation section 2001 receives the in-phase component and the quadrature component of the quadrature baseband signal as inputs, estimates the amount of transmission path distortion from the reception condition of the BPSK modulation symbol shown in FIG. 18 or the QPSK modulation symbol shown in FIG. 19 and outputs the amount of transmission path distortion to detection section 2002.

Detection section 2002 receives the in-phase component and the quadrature component of the quadrature baseband signal as inputs, detects information symbols based on the amount of transmission path distortion and outputs a reception digital signal.

In this way, by changing the modulation system of information symbols according to the communication situation such as fluctuations in the transmission path and the level of the reception signal, inserting a known pilot symbol when the information symbol modulation system is a multi-value modulation system with 8 or more values and changing the interval of inserting the above known pilot symbol according to the communication situation, it is possible to improve both the data transmission efficiency and the quality of data at the same time.

Here, in this embodiment, the transmission apparatus in FIG. 16 can also have a configuration equipped with BPSK symbol modulation section 602 shown in FIG. 6 instead of pilot symbol generation section 103.

In this case, frame configuration determination section 1601 determines the modulation system of the transmission digital signal based on the communication situation. For example, frame configuration determination section 1601 selects one of (701), (702), (703) or (704) in FIG. 7 above or (1701) or (1702) in FIG. 17 as the optimal frame configuration.

Then, frame configuration determination section 1601 outputs the signals indicating the determined modulation system to quadrature baseband modulation section 102. Also, when the determined modulation system uses 8 or more values, frame configuration determination section 1601 determines the interval of inserting BPSK modulation symbols based on the communication situation and outputs a signal indicating the determined interval of inserting the BPSK modulation symbols to BPSK symbol modulation section 602 and frame configuration section 104. Furthermore, when the determined modulation system is 8 fewer values, frame configuration determination section 1601 outputs a signal giving an instruction for stopping the generation of BPSK modulation symbols to BPSK symbol modulation section 602.

BPSK symbol modulation section 602 performs BPSK-modulation on a transmission digital signal at the timing indicated from frame configuration determination section 1601 and outputs the in-phase component and the quadrature component of the BPSK modulation symbols to frame configuration section 104. However, when instructed to stop the generation of BPSK modulation symbols from frame configuration determination section 1601, BPSK symbol modulation section 602 stops operation.

Transmission path distortion estimation section 2001 receives the in-phase component and the quadrature component of the quadrature baseband signal as inputs, estimates the amount of transmission path distortion from the reception condition of the BPSK modulation symbols shown in FIG. 8 and FIG. 9 above, the BPSK modulation symbols shown in FIG. 18 or the QPSK modulation symbols shown in FIG. 19 and outputs the amount of transmission path distortion to detection section 2002.

Furthermore, in this embodiment, the transmission apparatus in FIG. 16 can also have a configuration equipped with QPSK symbol modulation section 1102 shown in FIG. 11 instead of pilot symbol generation section 103.

In this case, frame configuration determination section 1601 determines the modulation system of the transmission digital signal based on the communication situation. For example, frame configuration determination section 1601 selects one of (1201), (1202), (1203) or (1204) in FIG. 12 above or (1701) or (1702) in FIG. 17 as the optimal frame configuration.

Then, frame configuration determination section 1601 outputs a signal indicating the determined modulation system to quadrature baseband modulation section 102. Also, when the determined modulation system uses 8 or more values, frame configuration determination section 1601 determines the interval of inserting QPSK modulation symbols based on the communication situation and outputs a signal indicating the determined interval of inserting the QPSK symbols to QPSK symbol modulation section 1102 and frame configuration section 104. Also, when the determined modulation system is 8 fewer values, frame configuration determination section 1601 outputs a signal giving an instruction for stopping the generation of QPSK modulation symbols to QPSK symbol modulation section 1102.

QPSK symbol modulation section 1102 performs QPSK-modulation on a transmission digital signal at the timing indicated from frame configuration determination section 1601 and outputs the in-phase component and the quadrature component of the QPSK modulation symbols to frame configuration section 104. However, when instructed to stop generating QPSK modulation symbols from frame configuration determination section 1601, QPSK symbol modulation section 1102 stops operation.

Transmission path distortion estimation section 2001 receives the in-phase component and the quadrature component of the quadrature baseband signal as inputs, estimates the amount of transmission path distortion from the reception condition of the QPSK modulation symbols shown in FIG. 13 or FIG. 14 and the BPSK modulation symbols shown in FIG. 18 or the QPSK modulation symbol shown in FIG. 19 and outputs the amount of transmission path distortion to detection section 2002.

Here, this embodiment explains two kinds of the interval of inserting a known pilot symbol, but the present invention is not limited to this. Also, this embodiment explains two kinds of the multi-value modulation system with 8 or more values of information symbols, 16QAM and the 8PSK modulation, but the present invention is not limited to this.

Furthermore, this embodiment describes the frame configurations in FIG. 2, FIG. 7, FIG. 12 and FIG. 17 but the present invention is not limited to these frame configurations.

Furthermore, the BPSK modulation method and the QPSK modulation method of the modulation system of information symbols of the present invention are not limited to the signal point layouts shown in FIG. 18 and FIG. 19 but π/2 shift BPSK modulation or π/4 shift QPSK modulation can also be used.

Embodiment 5

Embodiment 5 describes a digital radio communication method by which the interval of inserting a known pilot symbol, the number of signal points with one symbol immediately before and after a known pilot symbol (hereinafter referred to as "symbols before and after a pilot") and signal point layout and the modulation system of information symbols other than those symbols are changed.

Figure 21:
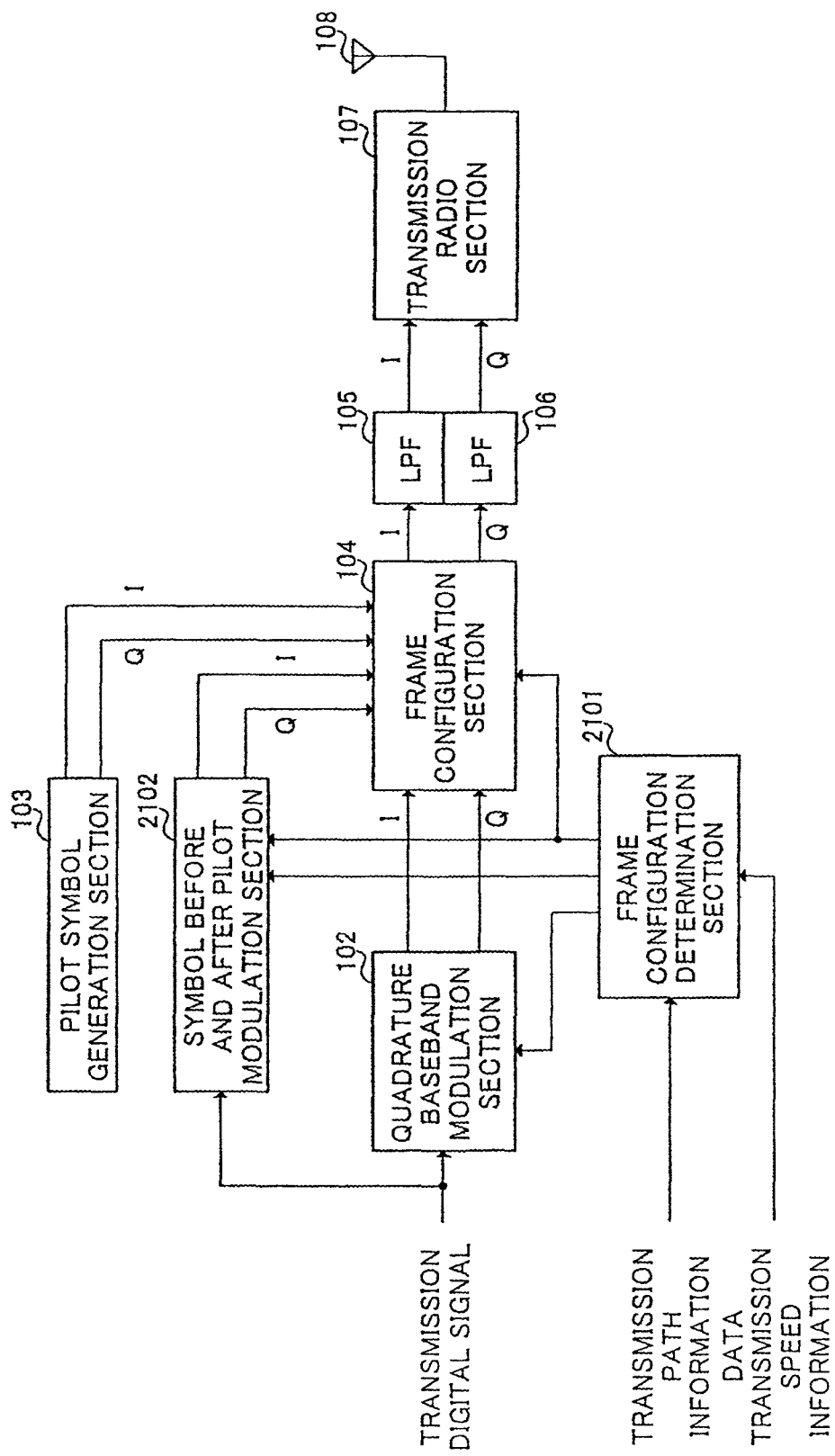
FIG. 21 is a block diagram showing a configuration of a transmission apparatus according to Embodiment 5 of the present invention.

FIG. 21 is a block diagram showing a configuration of the transmission apparatus according to this embodiment. In the transmission apparatus shown in FIG. 21, the components common to those in the transmission apparatus shown in FIG. 1 are assigned the same reference numerals as those shown in FIG. 1 and their explanations will be omitted.

In the transmission apparatus in FIG. 21, frame configuration determination section 2101 differs in the way of operation from frame configuration determination section 101 in FIG. 1. Furthermore, the transmission apparatus in FIG. 21 adopts a configuration with symbols before and after a pilot modulation section 2102 added compared to FIG. 1.

Frame configuration determination section 2101 determines the interval of inserting a known pilot symbol and the modulation system of a transmission digital signal based on the communication situation. In this case, frame configuration determination section 2101 uses different modulation systems for symbols before and after a pilot and for other information symbols.

Then, frame configuration determination section 2101 outputs a signal indicating the modulation system of symbols before and after a pilot to symbols before and after a pilot modulation section 2102, outputs a signal indicating the modulation system of other information symbols to quadrature baseband modulation section 102 and outputs a signal indicating the interval of inserting the determined known pilot symbol to symbols before and after a pilot modulation section 2102 and frame configuration section 104.

Symbols before and after a pilot modulation section 2102 modulates on a transmission digital signal by predetermined modulation system at the timing indicated from frame configuration determination section 2101 and outputs the in-phase component and the quadrature component of the symbols before and after a pilot to frame configuration section 104.

Figure 22:
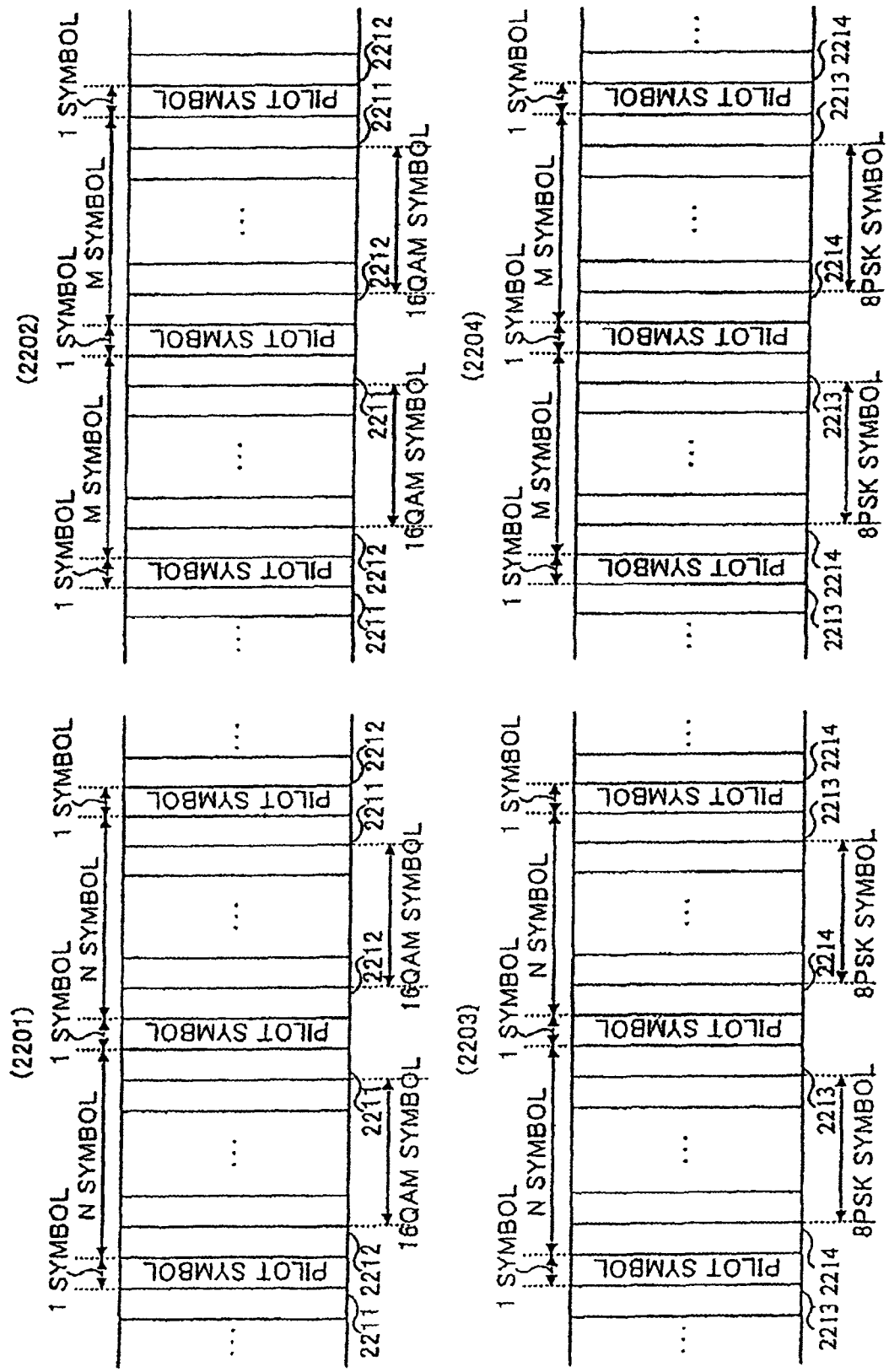
FIG. 22 illustrates examples of a frame configuration of a signal transmitted from the transmission apparatus of the Embodiment 5 of the present invention.

FIG. 22 illustrates examples of a frame configuration of a signal transmitted from the transmission apparatus of this embodiment and shows a time-symbol relationship. (2201) is a frame configuration when the modulation system of information symbols is 16QAM and a known pilot symbol interval is N symbols. (2202) is a frame configuration when the modulation system of information symbols is 16QAM and a known pilot symbol interval is M symbols. (2203) is a frame configuration when the modulation system of information symbols is 8PSK modulation and a known pilot symbol interval is N symbols. (2204) is a frame configuration when the modulation system of information symbols is 8PSK modulation and a known pilot symbol interval is M symbols. Suppose N<M at this time.

Signal point 2211 is 1 symbol immediately before the known pilot symbol when the information symbol modulation system is 16QAM and signal point 2212 is 1 symbol immediately after the known pilot symbol when the information symbol modulation system is 16QAM. Signal point 2213 is 1 symbol immediately before the known pilot symbol when the information symbol modulation system is 8PSK modulation and signal point 2214 is 1 symbol immediately after the known pilot symbol when the information symbol modulation system is 8PSK modulation.

Frame configuration determination section 2101 selects one of (2201), (2202), (2203) or (2204) in FIG. 22 as the optimal frame configuration based on the transmission path information and the request data transmission speed information.

For example, in the case of high-speed fading, frame configuration determination section 2101 sacrifices data transmission efficiency on the receiving side and selects a frame configuration of either (2201) or (2203) in FIG. 22 so that the interval of inserting a known pilot symbol becomes narrower to prevent deterioration of the data demodulation error rate and maintain the quality of data. On the other hand, in the case of low-speed fading, frame configuration determination section 2101 selects a frame configuration of either (2202) or (2204) in FIG. 22 to widen the interval of inserting a known pilot symbol to improve the data transmission efficiency.

Furthermore, when the level of the reception signal is large, frame configuration determination section 2101 gives priority to data transmission efficiency on the receiving side and selects a frame configuration of either (2201) or (2202) in FIG. 22 adopting 16QAM as the modulation system of information symbols. On the other hand, when the level of the reception signal is small; frame configuration determination section 2101 gives priority to increasing error resistance while sacrificing data transmission efficiency on the receiving side and selects a frame configuration of either (2203) or (2204) in FIG. 22 adopting 8PSK as the modulation system of information symbols.

Figure 23:
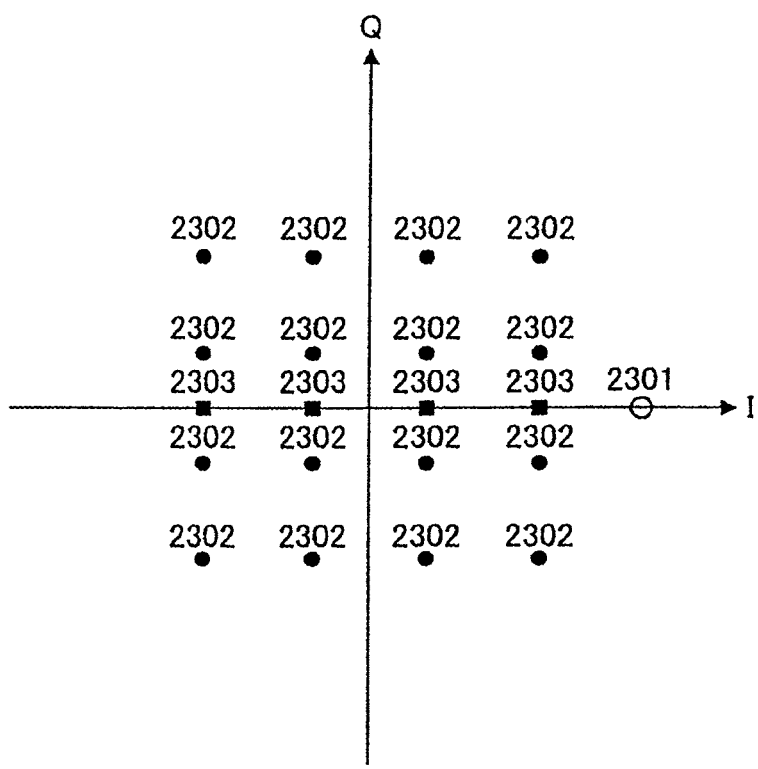
FIG. 23 is a layout of signal points of 16QAM, a known pilot symbol and symbols before and after the pilot symbol on an in-phase I—quadrature Q plane.

FIG. 23 shows a signal point layout according to the 16QAM modulation method on the in-phase I—quadrature Q plane and a signal point layout according to a known pilot symbol and a signal point layout of symbols before and after a pilot. Signal point 2301 is the signal point of a known pilot symbol, signal points 2302 are the signal points of 16QAM modulation symbols and signal points 2303 are the signal points of symbols before and after a pilot.

Figure 24:
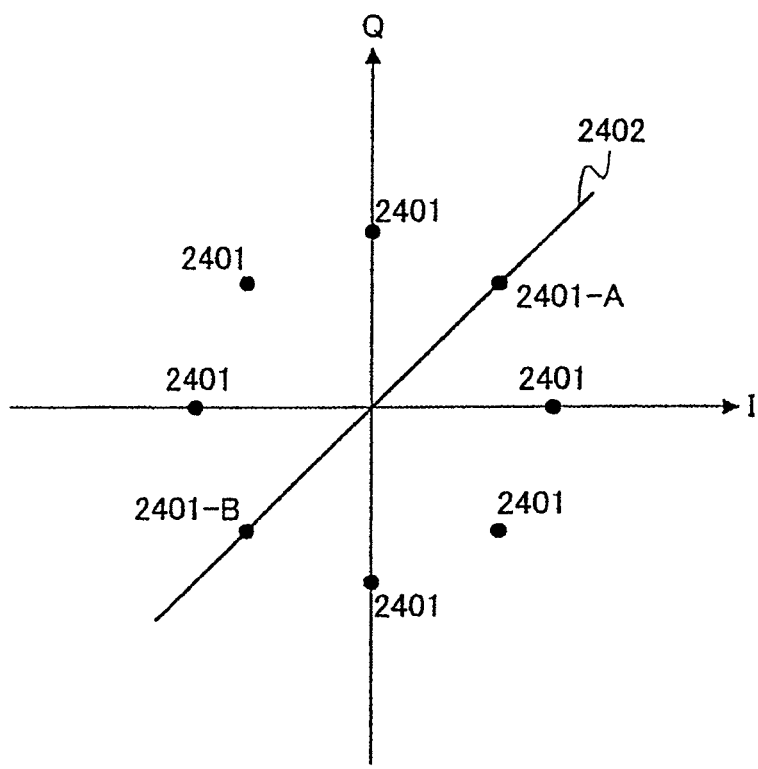
FIG. 24 is a layout of signal points of 8PSK modulation, a known pilot symbol and symbols before and after the pilot symbol on an in-phase I—quadrature Q plane.

FIG. 24 shows a signal point layout according to the 8PSK modulation system on the in-phase I—quadrature Q plane, a signal point layout of a known pilot symbol and a signal point layout of symbols before and after a pilot. Signal points 2401, 2401-A and 2401-B are the signal points of 8PSK modulation symbols, 2401-A is the signal point of the known pilot symbol, 2401-A and 2401-B are the signal points of symbols before and after a pilot and straight line 2402 is the straight line formed by linking the signal point of the known pilot symbol and the origin on the in-phase I—quadrature Q plane.

Figure 25:
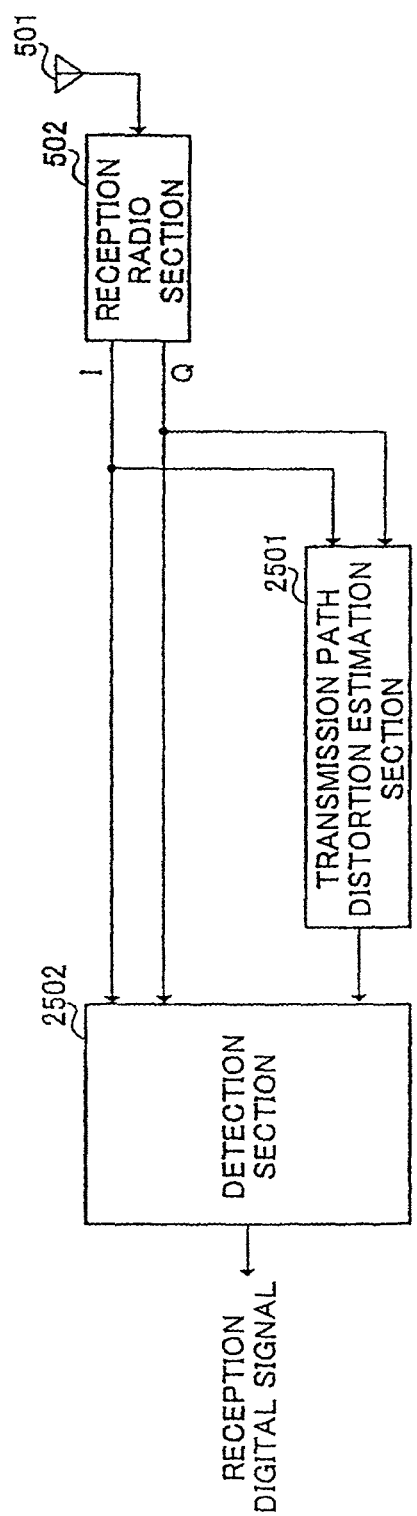
FIG. 25 is a block diagram showing a configuration of a reception apparatus according to Embodiment 5 of the present invention.

FIG. 25 is a block diagram showing a configuration of the reception apparatus according to this embodiment. In the reception apparatus shown in FIG. 25, the components common to those in the reception apparatus shown in FIG. 5 are assigned the same reference numerals as those shown in FIG. 5 and their explanations will be omitted.

In the reception apparatus in FIG. 25, transmission path estimation section 2501 differs in the way of operation from transmission path estimation section 503 and detection section 2502 differs in the way of operation from detection section 504 in FIG. 5.

Transmission path distortion estimation section 2501 receives the in-phase component and the quadrature component of the quadrature baseband signal as inputs, extracts the signal of the known pilot symbol shown in FIG. 23 and FIG. 24 above, estimates the amount of transmission path distortion from the reception condition of the known pilot symbol and outputs the amount of transmission path distortion to detection section 2502.

Detection section 2502 receives the in-phase component and the quadrature component of the quadrature baseband signal as inputs, detects information symbols including symbols before and after a pilot based on the amount of transmission path distortion and outputs a reception digital signal.

Thus, changing the interval of inserting a known pilot symbol and the modulation system of information symbols according to the communication situation such as fluctuations in the transmission path and the level of the reception signal can improve both the data transmission efficiency and the quality of data at the same time.

Furthermore, as shown in FIG. 23 and FIG. 24, by arranging two or more signal points before and after a pilot on the straight line formed by linking the origin and the signal point of the known pilot symbol on the in-phase I—quadrature Q plane, it is possible for the reception apparatus in FIG. 25 to suppress deterioration of the estimation accuracy of reference phase and the amount of frequency offset by the pilot symbol, even if symbol synchronization is not established completely when a reference phase and the amount of frequency offset is estimated from the pilot signal. When detection section 116 performs detection, this allows the bit error rate characteristic based on the carrier-to-noise ratio to be improved.

Here, this embodiment can be combined with Embodiment 4 above. That is, when the determined modulation system uses 8 or more values, frame configuration determination section 2101 in FIG. 21 determines the interval of inserting a pilot symbol based on the communication situation and outputs a signal indicating the interval of inserting the determined pilot symbol to symbols before and after a pilot modulation section 2102 and frame configuration section 104. Furthermore, when the determined modulation system uses 8 fewer values, frame configuration determination section 2101 outputs a signal giving an instruction for stopping the generation of pilot symbols to symbols before and after a pilot modulation section 2102 and pilot symbol generation section 103.

Pilot symbol generation section 103 generates a pilot symbol known between the transmitting and receiving sides and outputs the in-phase component and the quadrature component of the known pilot symbol to frame configuration section 104. However, when instructed to stop the generation of pilot symbols from frame configuration determination section 2101, pilot symbol generation section 103 stops operation.

Symbols before and after a pilot modulation section 2102 performs BPSK-modulation or QPSK-modulation on a transmission digital signal at the timing indicated from frame configuration determination section 2101 and outputs the in-phase component and the quadrature component of the symbols before and after a pilot to frame configuration section 104. However, when instructed to stop the generation of pilot symbols from frame configuration determination section 2101, symbols before and after a pilot modulation section 2102 stops operation.

This allows the effect of Embodiment 4 to be attained in addition to the effect of this embodiment as described above.

Here, this embodiment describes two kinds of modulation system of information symbols, 16QAM and 8PSK modulation, but the present invention is not limited to this.

Furthermore, this embodiment explains only the configuration of information symbols, a known pilot symbol, symbols before and after a pilot in FIG. 22, but the frame configuration of the present invention is not limited to the frame configuration composed of only information symbols, a known pilot symbol, symbols before and after a pilot.

As described above, according to the present invention, by changing the interval of inserting a known pilot symbol, BPSK modulation symbols or QPSK modulation symbols and the modulation system of information symbols according to the communication situation of fluctuations in the transmission path and the level of the reception signal, etc., it is possible to improve both the data transmission efficiency and the quality of data at the same time.

The present invention is not limited to the above described embodiments, and various variations and modifications may be possible without departing from the scope of the present invention.

This application is based on the Japanese Patent Application No. HEI 11-213289 filed on Jul. 28, 1999, entire content of which is expressly incorporated by reference herein.

The invention claimed is:

1. A transmission method comprising:
generating first symbols for transmitting data, a signal point of each of the first symbols on an in-phase and quadrature-phase plane comprising an in-phase component and a quadrature-phase component, a first symbol being a quadrature baseband signal;
generating a second symbol, the second symbol being a pilot symbol and a second quadrature baseband signal;
determining an interval of symbol insertion, outputting a signal indicating the determined interval, and selecting an insertion pattern of the second symbol, from a plurality of predetermined insertion patterns;
inserting the second symbol in the first symbols based on the selected insertion pattern to generate a transmission signal; and
transmitting the transmission signal,
wherein the first symbols are generated using a modulation scheme selected from a plurality of modulation schemes.

2. The transmission method according to claim 1, wherein the insertion pattern comprises an insertion interval of the second symbol in the first symbols.

3. The transmission method according to claim 1, wherein the modulation scheme used to generate the first symbol is selected from the plurality of modulation schemes based on a communication situation between a transmission apparatus and a reception apparatus.

4. The transmission method according to claim 2, wherein the insertion interval of the second symbol in the first symbols can be changed based on a communication situation between the transmission apparatus and the reception apparatus.

5. The transmission method according to claim 3, wherein the communication situation comprises transmission path information and reception signal level information.

6. A reception method that receives the transmission signal transmitted using the transmission method according to claim 1, the reception method comprising: receiving the transmission signal; estimating an amount of transmission path distortion of the received transmission signal; and outputting the estimated amount of transmission path distortion.

7. A transmission apparatus configured to:
generate first symbols for transmitting data, a signal point of each of the first symbols on an in-phase and quadrature-phase plane comprising an in-phase component and a quadrature-phase component, a first symbol being a quadrature baseband signal;
generate a second symbol, the second symbol being a pilot symbol and a second quadrature baseband signal;
determine an interval of symbol insertion, output a signal indicating the determined interval, and select an insertion pattern of the second symbol, from a plurality of predetermined insertion patterns;
insert the second symbol in the first symbols, based on the selected insertion pattern, to generate a transmission signal; and
transmit the transmission signal,
wherein the first symbols are generated using a modulation scheme selected from a plurality of modulation schemes.

8. The transmission apparatus according to claim 7, wherein the insertion pattern comprises an insertion interval of the second symbol in the first symbols.

9. The transmission apparatus according to claim 7, wherein the modulation scheme used to generate the first symbol is selected from the plurality of modulation schemes based on a communication situation between the transmission apparatus and a reception apparatus.

10. The transmission apparatus according to claim 8, wherein the insertion interval of the second symbol in the first symbols can be changed based on a communication situation between the transmission apparatus and the reception apparatus.

11. The transmission apparatus according to claim 9, wherein the communication situation comprises transmission path information and reception signal level information.

12. A reception apparatus that receives the transmission signal transmitted from the transmission apparatus according to claim 7, the reception apparatus comprising: a receiver that receives the transmission signal; and an estimator that estimates an amount of transmission path distortion of the received transmission signal and outputs the estimated amount of transmission path distortion.

* * * * *